(12) United States Patent
Goddard et al.

(10) Patent No.: US 8,481,421 B2
(45) Date of Patent: Jul. 9, 2013

(54) FUNCTIONAL ANCHORS CONNECTING GRAPHENE-LIKE CARBON TO METAL

(75) Inventors: William A. Goddard, Pasadena, CA (US); Weiqiao Deng, Pasadena, CA (US); Yuki Matsuda, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1088 days.

(21) Appl. No.: 12/179,345

(22) Filed: Jul. 24, 2008

(65) Prior Publication Data

US 2009/0029221 A1 Jan. 29, 2009

Related U.S. Application Data

(60) Provisional application No. 60/961,867, filed on Jul. 25, 2007, provisional application No. 60/962,082, filed on Jul. 26, 2007.

(51) Int. Cl.
*H01L 21/4763* (2006.01)

(52) U.S. Cl.
USPC .................................................. 438/618

(58) Field of Classification Search
USPC .............. 438/618; 556/136, 137; 977/762
See application file for complete search history.

(56) References Cited

U.S. PATENT DOCUMENTS

| | | | |
|---|---|---|---|
| 6,986,876 B2 | 1/2006 | Smalley | |
| 2002/0127169 A1 | 9/2002 | Smalley | |
| 2005/0075245 A1 | 4/2005 | Goddard | |
| 2006/0118777 A1* | 6/2006 | Hirakata et al. | 257/39 |
| 2007/0200175 A1* | 8/2007 | Matsui et al. | 257/347 |
| 2007/0255002 A1* | 11/2007 | Alba | 524/543 |

OTHER PUBLICATIONS

Bahr ,Jeffrey L. et al., Functionalization of Carbon Nanotubes by Electrochemical Reduction of Aryl Diazonium Salts: A Bucky Paper Electrode, J. Am. Chem. Soc. 2001, 123, pp. 6536-6542.
Banerjee, S. et al, Surface Chemistry of Carbon Nanotubes, Advanced Material 2005, 17 No. 1 Jan. 6, pp. 17-29.
Baughman, Ray H. et al., Carbon Nanotubes—the Route Toward Applications, Science 2002, 297, pp. 787-792.
Bethune, D.S. et al, Cobalt-catalysed growth of carbon nanotubes with single-atomic-layer walls, Nature 1993, 363, pp. 605-607.
Blurton, K.F. et al., Surface Area Loss of Platinum Supported on Graphite, Electrochim. Acta, 1978, 23, pp. 183-190.
Chen, Robert J. et al., Noncovalent functionalization of carbon nanotubes for highly specific electronic biosensors, Proc. Nat. Acad. Sci. USA 2003, 100, pp. 4984-4989.
Choi, K.H. et al., Controlled deposition of carbon nanotubes on a patterned substrate, Surface Science 462 (2000) pp. 195-202.
Deng, Wei-Qiao et al., Bifunctional Anchors Connecting Carbon Nanotubes to Metal Electrodes for Improved Nanoelectronics, J. Am. Chem. Soc. 2007, 129, pp. 9834-9835.
Deng, Wei-Qiao et al., Mechanism of the Stoddart-Heath Bistable Rotaxane Molecular Switch, J. Am. Chem. Soc. 2004, 126, pp. 13562-12563.
Dyke, Christopher A. et al., Unbundled and Highly Functionalized Carbon Nanotubes from Aqueous Reactions, Nano. Lett. 2003, 3, 1215.

(Continued)

*Primary Examiner* — Shaun Campbell
(74) *Attorney, Agent, or Firm* — Steinfl & Bruno, LLP

(57) ABSTRACT

Functional linkers or anchors interconnecting graphene-like carbon, such as nanotubes or graphite sheets, with a conducting material such as a metal, are shown, together with related structures, devices, methods and systems.

33 Claims, 31 Drawing Sheets

OTHER PUBLICATIONS

Endo, Morinobu et al., Applications of carbon nanotubes in the twenty-first century, Phil. Trans. R. Soc. Lond. A (2004) 362, pp. 2223-2238.
Frank, Stefan et al., Carbon Nanotube Quantum Resistors, Science 1998, 280, pp. 1744.
Gasteiger, Hubert et al., Activity benchmarks and requirements for Pt, Pt-alloy, and non-Pt oxygen reduction catalysts for PEMFCs, Appl. Cataly. B, Environ., 2005, 56, pp. 9-35.
Geim, A. K. et al., The Rise of Graphine, Nature Materials, 2007, 6, pp. 183-191.
Girishkumar, G. et al., Carbon Nanostructures in Portable Fuel Cells: Single-Walled Carbon Nanotube Electrodes for Methanol Oxidation and Oxygen Reduction, J. Phys. Chem. B 2004, 108, 19960-19966.
Guo, Xuefeng et al., Covalently Bridging Gaps in Single-Walled Carbon Nanotubes with Conducting Molecules, Science, 2006, 311, pp. 356-359.
Guo, Xuefeng et al., Thermal Diffusion of C60 Molecules and Clusters on Au(III), *J Phys. Chem. B* 2004, 108, 14074-14081.
Huang, Yu et al., Logic Gates and Computation from Assembled Nanowire Building Blocks, Science, 2001, 294, 1313-1317.
Iijima, Sumio, Helical microtubules of graphitic carbon, Nature, 1991, 354 pp. 56-58.
James, Dustin K. et al., Electrical Measurements in Molecular Electronics, *Chem. Mater.* 2004,16, pp. 4423-4435.
Javey, Ali et al., Ballistic carbon nanotube field-effect transistors, Nature, 2003, 424, 654-657.
Kanbara, Takayoshi et al., Contact resistance modulation in carbon nanotube devices investigated by four-probe experiments, Applied Physics Letters 88, 053118 (2006).
Ke, San-Huang, et al., Electron transport through molecules: Self-consistent and non-self-consistent approaches, Physical Review B 70, 085410 (2004).
Keren, Kinneret et al., DNA-Templated Carbon Nanotube Field-Effect Transistor, Science, 302, 1380-1382, 2003.
Kiang, Ching-Hwa et al., Catalytic Synthesis of Single-Layer Carbon Nanotubes with a Wide Range of Diameters, *J. Phys. Chem.* 1994, 98, pp. 6612-6618.
Kim, Yong-Hoon et al., First-principles approach to the charge-transport characteristics of monolayer molecular-electronics devices: Application to hexanedithiolate devices, Physical Review B 73, 235419 (2006).
Kim, Yong-Hoon et al., First-Principles Study of the Switching Mechanism of [2]Catenane Molecular Electronic Devices, Physical Review 94, 156801 (2005).
Klinke, Christian et al., Field-Effect Transistors Assembled from Functionalized Carbon Nanotubes, Nano Lett, 2006, 6, pp. 906-910.
Lee, Jeong-O, Formation of low-resistance ohmic contacts between carbon nanotube and metal electrodes by a rapid thermal annealing method, J. Phys. D: Appl. Phys. 33 (2000) pp. 1953-1956.
Li, Wenzhen et al., Preparation and Characterization of Multiwalled Carbon Nanotube-Supported Platinum for Cathode Catalysts of Direct Methanol Fuel Cells, 1. Phys. Chem. B 2003, 107, pp. 6292-6299.
Li, Sai et al., Transfer Printing of Submicrometer Patterns of Aligned Carbon Nanotubes onto Functionalized Electrodes**, Small, 2007, 4, pp. 616.
Liang, Feng et al., A Convenient Route to Functionalized Carbon Nanotubes, Nano Letters, 2004, 4, pp. 1257-1260.
Licata, T.J. et al, Interconnect fabrication processes and the development of low-cost wiring for CMOS products, J. Res. Develop. 1995, 39, pp. 419-435.
Liu, Jie et al., Controlled deposition of individual single-walled carbon nanotubes on chemically functionalized templates, Chemical Physics Letters 303 (1999) 125-129.
Luo, Yi et al., Two-Dimensional Molecular Electronics Circuits, Chem. Phys. Chem., 2002, 3, pp. 519-525.
Mann, David et al., Ballistic Transport in Metallic Nanotubes with Reliable Pd Ohmic Contacts, Nano Letters, 2003, vol. 3, No. 11, pp. 1541-1544.
Marty, L. et al., Schottky Barriers and Coulomb Blockade in Self-Assembled Carbon Nanotube FETs, Nano Letters, 2003, vol. 3, No. 8, pp. 1115-1118.
Matsuda, Yuki et al., Contact Resistance Properties between Nanotubes and Various Metals from Quantum Mechanics, J. Phys. Chem. C 2007, 111, pp. 11113-11116.
Mattsson, Ann E. et al., Designing meaningful density functional theory calculations in materials science-a primer, Modelling Simul. Mater. Sci. Eng. 13 (2005) pp. RI-R31.
McCreery, Richard L., Molecular Electronic Junctions, Chem. Mater. 2004,16, pp. 4477-4496.
McEuen, Paul L. et al., Single-Walled Carbon Nanotube Electronics, IEEE Transactions on Nanotechnology, vol. 1, No. 1, Mar. 2002, pp. 78-85.
McNally, P.J. et al., Geometric linewidth and the impact of thermal processing on the stress regimes induced by electroless copper metallization for Si integrated circuit interconnect technology, Journal of Applied Physics vol. 96. No. 12, Dec. 15, 2004, pp. 7596-7602.
Mickelson, E.T. et al., Solvation of Fluorinated Single-Wall Carbon Nanotubes in Alcohol Solvents, J. Phys. Chem. B 1999, 103, pp. 4318-4322.
Narain, Ravin et al., Modification of Carboxyl-Functionalized Single-Walled Carbon Nanotubes with Biocompatible, Water-Soluble Phosphorylcholine and Sugar-Based Polymers: Bioinspired Nanorods, Journal of Polymer Science: Part A: Polymer Chemistry. vol. 44. pp. 6568-6568 (2006).
Niyogi, S. et al. Chemistry of Single-Walled Carbon Nanotubes, Acc. Chem. Res. 2002, 35, pp. 1105-1113.
Oostinga, Jeroen B., Gate-induced insulating state in bilayer graphene devices, Nature Materials 2008, 7, pp. 151-157.
Perdew, John P., Generalized Gradient Approximation Made Simple, Physical Review Letters, vol. 77, No. 18, Oct. 28, 1996, pp. 3865-3868.
Ramanathan, T. et al., Amino-Functionalized Carbon Nanotubes for Binding to Polymers and Biological Systems, Chem. Mater. 2005, 17, pp. 1290-1295.
Ryan J.G., et al., The evolution of interconnection technology at IBM, IBM J. Res. Develop. vol. 39, No. 4, Jul. 1995.
Schultz, Peter A. et al., SeqQuest Electronic Structure Code, (Sandia National Laboratories, Albuquerque, NM, 2008) http://www.cs.sandia.gov/~paschul/Quest.
Seminario, Jorge M. et al., Theoretical Analysis of Complementary Molecular Memory Devices, The Journal of Physical Chemistry, vol. 105, No. 5, Feb. 8, 2001, pp. 791-795.
Shirai, Yasuhiro et al., Directional Control in Thermally Driven Single-Molecule Nanocars, Nano Letters, 2005, vol. 5, No. 11, pp. 2330-2334.
Song, Chen et al., Ab initio study of base-functionalized single walled carbon nanotubes, Chemical Physics Letters 415 (2005) pp. 183-187.
Talanov, Vladimir et al., Noncontact electrical metrology of *Cu/low-k* interconnect for semiconductor production wafers, Applied Physics Letters 88, 262901 (2006).
Veloso, Marcos et al., Ab initio study of covalently functionalized carbon nanotubes, Physics Letters 430 (2006) pp. 71-74.
Wang, Xin et al., CNT-Based Electrodes with High Efficiency for PEMFCs, *Electrochemical and Solid-State Letters*, 8 (1) pp. A42-A44 (2005).
Wang, Cheng et al., Proton Exchange Membrane Fuel Cells with Carbon Nanotube Based Electrodes, Nano Letters, 2004, vol. 4, No. 2, pp. 345-348.
Wang, Yubing et al., Rapidly Functionalized, Water-Dispersed Carbon Nanotubes at High Concentration, J. Am. Chem Soc. 2006, 128, pp. 95-99.
Xie, Jian et al., Durability of PEFCs at High Humidity Conditions, Journal of The Electrochemical Society, 152 (1) pp. A104-A113 (2005).
Xue, Yongqiang et al., Charge transfer and "band lineup" in molecular electronic devices: A chemical and numerical interpretation, Journal of Chemical Physics vol. 115, No. 9, Sep. 1, 2001 pp. 4292-4299.

Yasuda, Kazuaki, et al., Platinum dissolution and deposition in the polymer electrolyte membrane of a PEM fuel cell as studied by potential cycling, Phys. Chem. Chem. Phys., 2006, 8, pp. 746-752.

Zhang, Yongfan et al., Carbon Nanotubes Functionalized by N02: Coexistence of Charge Transfer and Radical Transfer, J. Phys. Chem. B 2006, 110, pp. 22462-22470.

Zhang, Yuegang, et al., Electric-field-directed growth of aligned single-walled carbon nanotubes, Applied Physics Letters, vol. 79, No. 19, Nov. 5, 2001, pp. 3155-3157.

Ziegler, Mathew et al., Scalability Simulations for Nanomemory Systems Integrated on the Molecular Scale, Ann. N.Y. ,Acad. Sci. 1006: pp. 312-330 (2003).

Zurek, Eva et al., A Density Functional Study of the 13C NMR Chemical Shifts in Functionalized Single-Walled Carbon Nanotubes, J. Am. Chem. Soc. 2007, 129, pp. 4430-4439.

Zutic, Igor, et al., A path to spin logic, Nature Phys., 2005, 1, pp. 85-86.

PCT Search Report for PCT/US2008/071059 in the name of California Institute of Technology filed on Jul. 24, 2008.

PCT Written Opinion for PCT/US2008/071059 in the name of California Institute of Technology filed on Jul. 24, 2008.

\* cited by examiner

|  | C-anchor distance (A) | C-anchor (eV) | Pt-anchor distance(A) | Pt-Anchor (eV) | Resistance (K ohm) |
|---|---|---|---|---|---|
| Pure | 3.410 | 0.0992 |  |  | 1480 |
| -S- | 3.545 | 0.0002 | 1.482 | 5.87 | 43800 |
| -O- | 1.366 | 2.22 | 2.055 | 0.69 | 49.2 |
| -N- | 1.350 | 6.50 | 1.979 | 2.68 | 54.0 |
| -SO$_3$- | 1.858 | 0.37 | 2.194 | 1.79 | 27.4 |
| -COO- | 1.539 | 1.84 | 2.074 | 2.18 | 37.7 |
| -CON- | 1.538 | 1.89 | 2.051 | 3.78 | 23.6 |

FIG. 5

$$I(V) = \frac{2e}{h} \int_{-\infty}^{\infty} T(E,V)[f_1(E,V_1) - f_2(E,V_2)]dE$$

| Position | atop | FCC | HCP | bridge |
|---|---|---|---|---|
| Snap bond energy (kcal/mol) | 45.2 | 45.3 | 46.5 | 46.9 |
| relative energy[a] (kcal/mol) | 1.7 | 1.6 | 0.4 | 0 |
| perpendicular separation[b] (Å) | 2.00 | 1.81 | 1.84 | 1.81 |
| Cu–C distance[c] (Å) | 1.98 | 2.13, 2.40, 2.71 | 2.11, 2.51, 2.66 | 2.16, 2.19 |

[a] Lowest energetic is defined as 0

[b] Z-coordinates of the atoms on Cu(111) surface are averaged

[c] Nearest neighbour atoms

FIG. 15

| Position | atop | FCC | HCP | bridge |
|---|---|---|---|---|
| Snap bond energy (kcal/mol) | 88.8 | 103.5 | 102.7 | 99.3 |
| relative energy[a] (kcal/mol) | 14.7 | 0 | 0.7 | 4.2 |
| perpendicular separation[b] (Å) | 1.83 | 1.37 | 1.40 | 1.56 |
| Cu-C bond distance[c] (Å) | 2.11 | 2.00, 2.08, 2.13 | 2.06, 2.10, 2.19 | 2.03, 2.07 |

[a] Lowest energetic is defined as 0

[b] Z-coordinates of the atoms on Cu(111) surface are averaged

[c] Nearest neighbour atoms

| initial structure[a] | (CH$_3$)CONH$_2$ | (CH$_3$)CONH, H | (CH$_3$)CON, 2H |
|---|---|---|---|
| Final atom position | O, on | O, on; N, bridge | N, FCC |
| Snap bond energy (kcal/mol) | 113.0 | 122.2 | 95.9 |
| relative energy[b] (kcal/mol) | 9.5 | 0 | 26.4 |
| perpendicular separation[c] (Å) | 1.81 | 1.58 | 0.96 |
| Cu-O bond distance[d] (Å) | 2.17 | 2.10 | – |
| Cu-N bond distance[d] (Å) | – | 2.09, 2.17 | 2.00, 2.01, 2.09 |

[a] To compare the energetics per unit cell, hydrogen atoms are bonded on the Cu(111) surface for (CH$_3$)CONH and (CH$_3$)CON
[b] Lowest energetic is defined as 0
[c] Z-coordinates of the atoms on Cu(111) surface are averaged
[d] Nearest neighbour atoms

FIG. 19

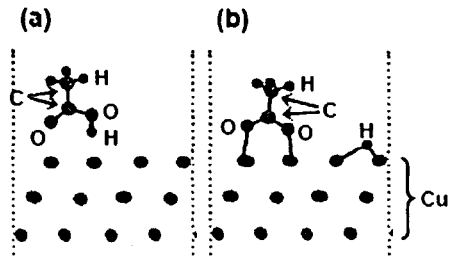

FIG. 20

| initial structure[a] | (CH₃)COOH | (CH₃)COO, H |
|---|---|---|
| Final atom position | — | O(1), on; O(2), bridge |
| Snap bond energy (kcal/mol) | 13.0 | 70.3 |
| relative energy[b] (kcal/mol) | 5.4 | 0 |
| perpendicular separation[c] (Å) | 2.26 | 1.75 |
| Cu-O bond distance[d] (Å) | — | Cu-O(1), 2.08; Cu-O(2), 2.19, 2.39 |

[a] One hydrogen atom is added for (CH₃)COO to compare the energetic per unit cell

[b] Lowest energetic is defined as 0

[c] Z-coordinates of the atoms on Cu(111) surface are averaged

[d] Nearest neighbour atoms.

|  |  | total energy (kcal/mol) | | | energy by adding second HCC- (kcal/mol) | | |
|---|---|---|---|---|---|---|---|
|  |  | S.B.[a] | A.B.[b] | G.S.[c] | S.B.[a] | A.B.[b] | G.S.[c] |
| first HCC- | – | 79.7 | 33.7 | 46.0 | – | – | – |
| second HCC- | a2 | 142.6 | 80.4 | 61.4 | 62.9 | 46.7 | 15.5 |
|  | a3 | 147.3 | 83.9 | 62.7 | 67.6 | 50.2 | 16.7 |
|  | b4 | 143.5 | 81.3 | 61.4 | 63.8 | 47.6 | 15.4 |
|  | c | 138.2 | 75.9 | 61.7 | 58.5 | 42.2 | 15.7 |
|  | d5 | 128.3 | 62.9 | 64.8 | 48.6 | 29.2 | 18.8 |
|  | d4 | 126.4 | 63.0 | 62.7 | 46.7 | 29.3 | 16.8 |
|  | e2 | 128.2 | 63.5 | 64.2 | 48.5 | 29.6 | 18.3 |
|  | f | 128.3 | 63.0 | 64.8 | 48.6 | 29.2 | 18.8 |

[a] S.B. snap bond energy

[b] A.B. adiabatic bond energy

[c] G.S. graphene strained energy in graphene caused by bonding HCC–

FIG. 24

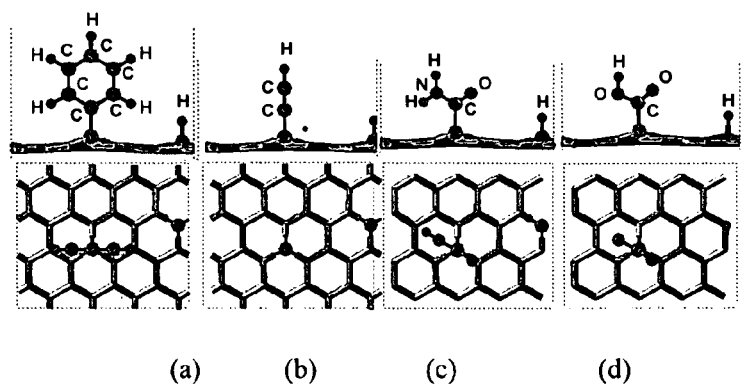

| Anchor | C6H5– | CCH– | CONH2– | COOH– |
|---|---|---|---|---|
| Snap bond energy[a] (kcal/mol) | 58.9 | 82.6 | 42.0 | 50.5 |
| graphene strain energy[b] (kcal/mol) | 13.9 | 14.1 | 11.1 | 13.9 |
| perpendicular separation[c] (Å) | 1.58 | 1.48 | 1.63 | 1.59 |

[a] Snap bond energy was calculated for each anchor (H atom is excluded)
[b] Deformation energy in graphene caused by bonding an anchor (H atom is excluded)
[c] Perpendicular separation between the carbon atom of an anchor and the bonded carbon atom on graphene. Z-coordinates of the atoms on Cu(111) surface are averaged

FIG. 26

| Anchor | –C$_6$H$_4$– | –CC– | –CONH– | –COO– | no anchor[a] |
|---|---|---|---|---|---|
| Snap bond energy (kcal/mol) | 106.1 | 168.9 | 117.8 | 123.9 | 4.8 |
| anchor–Cu(111) surface separation[b] (Å) | 1.97 | 1.33 | 1.88 | 2.03 | – |
| anchor–graphene separation[c] (Å) | 1.58 | 1.48 | 1.62 | 1.64 | – |
| Cu(111) –graphene separation[d] (Å) | 7.03 | 4.62 | 4.65 | 4.73 | 3.30 |

[a] See reference [50]
[b] The shortest perpendicular separation between the C or N or O atom of an anchor and Cu(111) surface. Z-coordinates of the atoms on Cu(111) surface are averaged
[c] Perpendicular separation between the carbon atom of an anchor and the bonded carbon atom on graphene
[d] Z-coordinates of atoms on each surface are averaged

FIG. 27

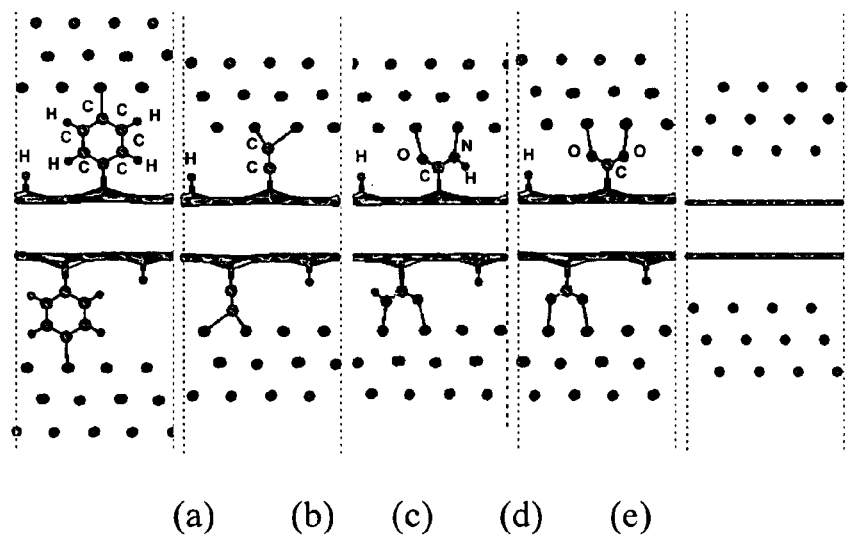

| Anchor | –C$_6$H$_4$– | –CC– | –CONH– | –COO– | no anchor[a] |
|---|---|---|---|---|---|
| contact resistance[b] (kΩ) | 10080 | 127.5 | 63.7 | 42.6 | 11716 |
| inverse ratio | 1.1 | 92 | 184 | 275 | 1.0 |

[a] See reference [50]

[b] per unit area of 0.735 nm$^2$

FIG. 30

FUNCTIONAL ANCHORS CONNECTING GRAPHENE-LIKE CARBON TO METAL

CROSS REFERENCE TO RELATED APPLICATIONS

The present application claims priority to U.S. Provisional Application No. 60/961,867 filed on Jul. 25, 2007 and U.S. Provisional Application No. 60/962,082 filed on Jul. 26, 2007, both of which are incorporated herein by reference in their entirety.

STATEMENT OF GOVERNMENT INTEREST

The U.S. Government has certain rights in this invention pursuant to Grant No(s). CCF-0524490 & CTS-0548774 awarded by the National Science Foundation.

FIELD

The present disclosure relates to organic linkers. In particular, it relates to a functional linker linking a graphene-like carbon and or a graphene sheet, with a conducting material. More in particular, in some embodiments, it relates to a structure comprising a carbon nanotube or a graphene sheet, a metal, and an organic linker linking the carbon nanotube with the metal.

BACKGROUND

Carbon nanotubes, graphene sheets such as single graphene sheets (SGS), and arrays of these materials (hereafter referred to collectively as graphene-like carbon or GLC) have enormous opportunities for novel electric, mechanical and chemical properties [See references 1-5]. Numerous breakthroughs have been demonstrated successfully and have led to practical fabrication of carbon nanotube electronics devices, such as transistors, interconnects, spintronics, and sensors [See references 6-8].

GLCs are also promising candidate materials for lowest level on-chip interconnect conducting material of future integrated circuits, because they address such issues as signal propagation delay and process integration density and scaling, which are currently limited by Cu and Al metal wires.

However, a fundamental problem with these systems is the nature of the attachment to supports and conducting material. Major issues are mechanical stability, integrity of the electrical contact, and contact resistance between the conducting material that constitutes the support or the electrode (ES) and the GLC, hereafter denoted the ES-GLC interface.

The difficulty in achieving the desired mechanical and electrical properties arises from the nature of the bonding in GLC, which is characterized by $sp^2$ or planar carbons with strong delocalization or resonance in the out of plane pi orbitals. As a result the atoms in these planes interact only weakly with a support or electrode onto which they are attached. This leads to low binding energies (sometimes called van der Waals or Noncovalent bonding) and consequently weak mechanical strength. Concomitantly there is little delocalization of the active electrons the GLC with the ES, leading to a high contact resistance (low current for a given voltage across the interface) and capacitance (due to accumulation of charge as the voltage is ramped with time).

Quantum mechanics (QM) methods (Green's function [see references 16-21] with density functional theory, DFT) have been used to evaluate these mechanical and electrical properties from first principles. It has been shown that the most popular choices for electrodes (Cu, Au, and Pt) in the current settings lead to very poor mechanical and electrical properties. Of the more noble metals (less susceptible to oxidation), Pd has been shown to be the best in the current settings. It has also been shown that electropositive metals, such as Ti (the same would be true for Sc—Ni, Y—Ru, La—Os, Ac-Lw), make good mechanical and electrical contacts in the current settings but may lead to practical problems, since in the current settings they react with the carbon from the GLC and shows a diminished mechanical and electrical contact in presence of oxygen.

The above problems are also present in fuel cell technology. With reference to fuel cell electrodes, transport of protons, electrons, and molecules are all determining factors in high performance fuel cell electrodes [see reference 24] One strategy for enhancing mass and electron transport is to use a nanostructured fuel cell electrode consisting of carbon nanotubes (CNT) loaded with Pt nanoparticles (Pt NPs) [see references 25-28]. The same problems identified above apply to fuel cells manufactured according to this strategy and used the settings currently known.

A further issue relates to the ES material used. Cu is currently the leading on-chip interconnect for integrated circuits, with fabrication processes established in the 1990's that have been well studied and improved since then. [see references 46-49] Advantages of Cu that have led to its extensive use in electronics is that it has the second highest electrical conductivity of pure metals and is abundant and inexpensive. Thus, it would be most desirable to connect Cu electrodes directly to the GLCs. However, it has been previously shown that the Cu-CNT interface in the current settings leads to extremely high contact resistance (11.7 MΩ), 672 times worse than Ti (17.4 kΩ) and 74 times worse than Pd-CNT interface (159 kΩ). [see reference 50] In addition, in the current settings Cu is mechanically weak. [see reference 50] As a result, metal contacts to CNT electrodes have preferred Pd, with little use of Cu.

SUMMARY

Structures, methods and systems are herein disclosed that allow an attachment between a GLC and a conducting material that ensures mechanical stability, integrity of the electrical contact, thermal contact and/or a minimized contact resistance and capacitance between the conducting material and the GLC. As a consequence, the structures, methods and systems herein disclosed can be used to provide an ES GCL interface in any devices, structures and systems wherein an ES GCL interface is used or desirable.

According to a first aspect, a structure is disclosed, the structure comprising: a graphene-like carbon; a conducting material; and a functional linker, linking the graphene-like carbon and the conducting material thus forming a graphene-like carbon-functional linker-conducting material structure.

According to a second aspect, an integrated circuit is disclosed. The integrated circuit comprises: a structure herein disclosed. In particular, the integrated circuit can include at least one interconnect layer, and at least one electrode. More particularly, in the integrated circuit the functional linker can link a graphene-like carbon in the at least one interconnect layer with a conducting material in the at least one electrode.

According to a third aspect, a method of manufacturing an integrated circuit is disclosed. The method comprises: providing at least one electrode, the electrode comprising conducting material; providing at least one interconnect layer, the interconnect layer comprising graphene-like carbon; providing a functional linker able to link the conducting material and the graphene-like carbon; and contacting the at least one electrode with the functional linker and the at least one portion of the interconnect layer to form an electrode-functional linker-interconnect layer structure, the electrode-functional linker-interconnect layer structure being part of the integrated circuit.

According to a fourth aspect, a fuel cell is disclosed. The fuel cell comprises: a support comprising a graphene-like carbon; an anode comprising a conducting material; a proton exchange electrolyte membrane; and a cathode comprising a conducting material, wherein at least one of the anode and the cathode is linked to the graphene-like carbon by a functional linker capable of linking the conducting material and the graphene-like carbon in a graphene-like carbon-functional linker-conducting material structure.

According to embodiments of the present disclosure, an approach is provided to improve the electrical contact (reducing the contact resistance and capacitance of the ES-GLC) while simultaneously improving the mechanical strength of the ES-GLC interface.

According to embodiments of the present disclosure ES-GLC interfaces can be provided with at least one or any combination of a) mechanical stability, b) electrical contact, c) thermal contact, and/or d) minimized contact resistance/capacitance between the conducting material and the GLC improved with respect to prior art structures.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the disclosure.

FIG. 5 shows a table with results of experiments conducted with reference to a Pt metal contact.

FIG. 15 shows a table with snap bond energy results for the modeling of FIG. 14.

FIG. 19 shows a table with snap bond energy results for the modeling of FIG. 18.

FIG. 20 shows a series of representations for modeling of a Cu-carboxyl anchor.

FIG. 21 shows a table with snap bond energy results for the modeling of FIG. 20.

FIGS. 23 and 24 show adiabatic and snap bond energies related to addition of one or two molecules of ethylene.

FIG. 25 shows a series of representations for modeling of a graphene anchor.

FIGS. 26 and 27 show tables with snap bond energy results for graphene and several anchors.

FIG. 28 shows I-V models constructed from optimized geometries by reversing one of the models and placing it at the AB stacking positions of the original graphene sheet.

FIGS. 29 and 30 shows diagrams and a table for evaluating contact resistance of Cu(111)-anchor-graphene models.

DETAILED DESCRIPTION

Figure 1:
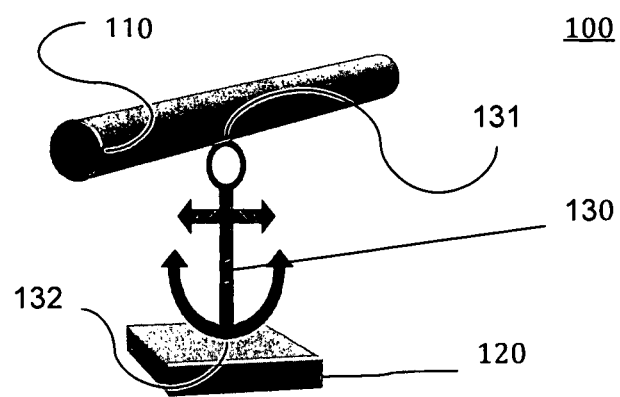
FIG. 1 shows a schematic representation of the connection between components of the structure according to an embodiment herein disclosed.

Structures, methods and systems are disclosed wherein graphene-like carbon is linked with a conducting material by a functional linker. In particular, a structure is described comprising: a graphene-like carbon; a. conducting material; and a functional linker, linking the graphene-like carbon and the conducting material thus forming a graphene-like carbon-functional linker-conducting material structure.

The wording "graphene like carbon" as used herein indicates a carbon containing material comprising an sp2-bonded carbon atom Exemplary graphene-like carbon includes but are not limited to carbon nanotubes, such as single-walled carbon nanotubes, double-walled carbon nanotubes, multiple-walled carbon nanotubes, carbon nanotube bundles and carbon nanotube fibers, single layer graphenes, multiple layer graphenes, graphite surfaces, and graphene nano ribbons. Additional exemplary graphene like carbon include fullerenes such as amorphous carbon wherein the term "amorphous carbon" indicates a carbon containing material in which there is no long-range order of the positions of the atoms comprising an sp2 bonded carbon atom. Exemplary amorphous carbons are given by fuel cell catalyst carbon support and diamond-like carbon.

The wording "conducting material" as used herein indicates any material able to conduct an electric current wherein an electric current is the flow (movement) of an electric charge. Exemplary conducting materials according to the present disclosure include but are not limited to metals, metal alloys, metal carbides, metal hydrides, metal oxides, metal sulfides, wherein the term metal indicates an element that readily loses electrons to form positive ions (cations) and forms metallic bonds between other metal atoms (forming ionic bonds with non-metals); the term metal alloys indicate is a solid solution or homogeneous mixture of two or more elements, at least one of which is a metal, which itself has metallic properties, the term metal carbide indicates a compound comprising a carbon-metal bond; the term metal hydrides indicates a compound comprising a hydrogen metal bond; the term metal oxides indicates a compound comprising a oxygen metal bond.

Exemplary metals include but are not limited to transition metals and more particularly to platinum palladium titanium copper, tungsten, gold and silver. Exemplary metal alloys include but are not limited to Pt3Co and other alloys of cobalt, alloys of copper and alloys of silver. Exemplary metal carbides include but are not limited to TiC, WC and TaC Exemplary metal hydrides include but are not limited to PdH and PtH. Exemplary metal oxides include but are not limited TiO2, VOx, FeOx with x=2 or 3, and ITO. Exemplary metal sulfides include but are not limited to MoS2, FeS, ZnS, AgS.

The term "link", "linker", "linking" and the likes, as used herein indicate a connection between at least two materials wherein the two materials share electrons. In particular, the term "linker" indicates a material able to share electrons with at least one material other than the linker itself.

Figure 2:
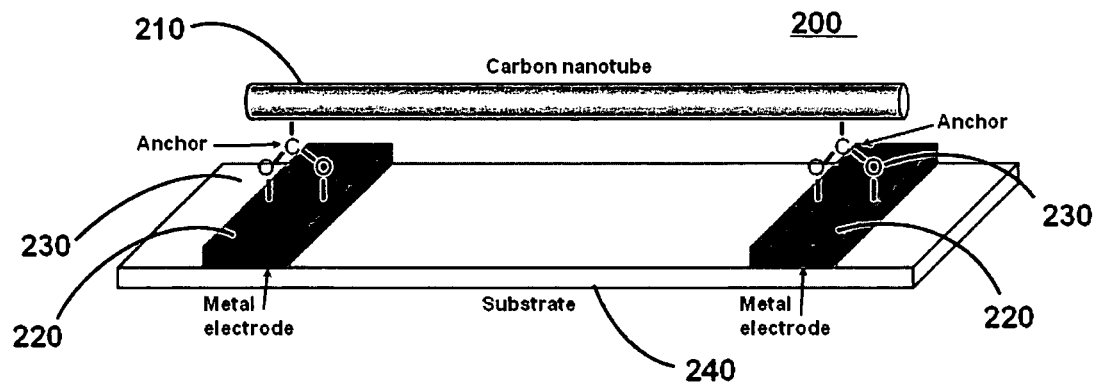
FIG. 2 shows a schematic view of a structure according to an embodiment of the present disclosure.

The wording "functional linker" or "functional anchor" as used herein indicates any material including a first portion able to link a graphene-like carbon and a second portion able to link a conducting material. In particular, according to the present disclosure the functional linker can bond to the graphene-like carbon through a covalent bond and to the conducting material through an electron sharing bond. A covalent bond is a form of chemical bonding that is characterized by the sharing of pairs of electrons between atoms, or between atoms and other covalent bonds Exemplary covalent bonds include but are not limited to σ-bonding, π-bonding, metal-metal bonding, agostic interactions, and three-center two-electron bonds. Exemplary electron sharing bond include but are not limited to ionic bond, hydrogen bond and covalent bond The linkage between GLC, conducting material and functional anchor is schematically illustrated in FIG. 1. In the schematic illustration of FIG. 0, the structure (100) includes a GLC (110 a conducting material (120) and a functional linker (130). In the structure (100), the functional linker or anchor (130) comprises 2 organic functional groups at head (131) and tail (132) of the linker which can form chemical bonds with GLC (110) and conducting material (120), respectively In an exemplary embodiment schematically illustrated in FIG. 2, a functional molecular anchor (230) connects, a metal contact (220) to a carbon carbon nanotube or CNT (210) both mechanically and electrically in a structure (200). In the illustration of FIG. 2, the structure (200) also includes a support (240) below metal (220). As shown throughout the present disclosure, an appropriate molecular anchor can function as an electron transport helper and as a mechanical mobility stopper.

In some embodiments, the functional linker is a π conjugated functional linker wherein a π conjugated functional linker indicates a linker including delocalized electrons within an orbital that extends across adjacent parallel aligned p-orbitals. More particularly π conjugated functional linker indicates atoms covalently bonded with alternating single and multiple (e.g. double) bonds (e.g., C=C—C=C—C) in a molecule of an organic compound.

In some embodiments, the functional anchor is an organic linker wherein an organic functional linker is a linker formed by any chemical compound that comprises carbon In some embodiments, the functional linker has a general formula $A_l B_m Z_n$ with l=0 or 1, m=0 or 1 and n=0 or 1, wherein at least one of l and n is 1, wherein A is a functional group having the ability to bind to the conducting material, Z is a functional group having the ability to bind the graphene-like carbon, and B is a functional group having the ability to bind to both A and Z. The wording "functional group" as used herein indicates a specific group of atoms within a molecule that is responsible for the characteristic chemical reactions of that molecule. The same functional group will undergo the same or similar chemical reaction(s) regardless of the size of the molecule it is a part of. However, its relative reactivity can be modified by nearby functional groups.

Accordingly, the functional linker can be selected from the group consisting of A, Z, AZ, ABZ.

In some embodiments, functional group A can be a compound binding the conducting material through a H bond selected from the group consisting of QRp, wherein Q is an element independently selected from the group consisting of O, N, C, B, S, P, Si, Al, Se, As, Ge, Ga In, Sn, Sb, Te, Ti, Pb, Bi, and Po, R is any combination of atoms bonded to Q, p is equal to or greater than 0, or any combination of two or more of said QRp linked together through X, with X being a collection of atoms.

In some embodiments, functional group A can be selected from the group consisting of a carboxylic group, nitrogen, carboxamide, thiol, sulfuric acid, phosphate acid benzene acetylene, amide and any of the compounds having the following formulas —S—, —O—, —N—, —SO3-, —COO—, and —CON—.

In some embodiments, functional group Z is a group able to bind a p-π orbital in the graphene-like carbon, and in particular identifies a group able to bind the p-π orbital through a σ orbital, a π orbital or an sp3 orbital. In some embodiments, functional group Z can be selected from the group consisting of phenyl acetyl, oxygen, nitrogen and a carbon containing group binding a p-π orbital in the graphene-like carbon through a p-π orbital in the carbon containing group.

In some embodiments, functional group B is a compound of formula $(CR_m)_n$ wherein R can be independently selected from H, a group containing oxygen (e.g. hydroxyl, carbonyl, aldehyde, carbonate ester, carboxylate, carboxyl, ester, hydroperoxy, peroxy), amide or other groups containing nitrogen (e.g. carboxamide, primary amine, secondary amine, tertiary amine 4 ammonium ion, primary ketamine, secondary ketimine, primary aldimine, secondary aldimine, imide, azide, azo diimide, cyanate, isocyanate, isothiocyanate, nitrate, nitrite, nitrile, nitrosooxy, nitro, nitroso, pyridil), an halogen (e.g. fluoro, chloro, bromo and iodo), or a group containing phosphorous or sulphur (e.g. phosphino, phosphate, phosphono, sulfonyl, sulfo, sulfinyl, sulfhydryl, thiocyanate, disulfide) m=0, 1 or 2 and n=integer. In particular, functional group B comprises a linear substituted or unsubstituted aliphatic compound that can comprise an aromatic or aliphatic ring, but that generally links A and Z through an aliphatic moiety. In some embodiments, functional group B can be selected from the group consisting of conjugated groups such as $-(C=C)_n-$, $-(C=C-C=C)_n-$, $-(C\equiv C-C\equiv C)_n-$, which can be unsubstituted or substituted with one or more of the above mentioned groups.

The specific A, B and Z for a specific structure depend on the specific GLC and conducting material connected by the anchor.

For example, in some embodiments of the structures associated with mechanical stability of the ES-GLC interface, the functional linker can be linked to the GLC and the conducting material through covalent bond. Exemplary functional linkers representative of this embodiments are

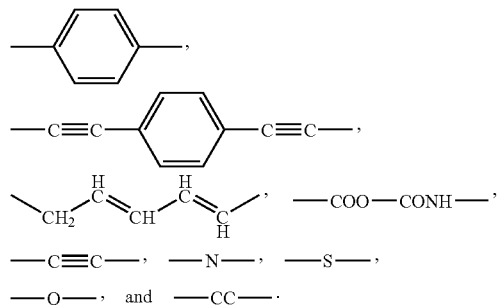

As a further example, in embodiments of the structure associated with increased electrical connection and/or reduced resistance/capacitance of ES-GLC interface over prior art structures the functional linker can be any linker with an energy state such that, a flow of electron can occur upon linkage of the functional linker with the conducting material and the GLC of choice. More particularly, in some of those embodiments, wherein a source and a drain formed of conducting materials are linked to the GLC, also the GLC and the conducting material forming the source and the drain can be selected so that a flow of electrons from the source through the GLC to the drain can occur upon linkage of the source and the drain with the GLC of choice. Exemplary functional linkers that can be used in structures associated with enhanced electrical conductivity are

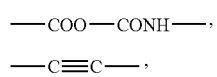

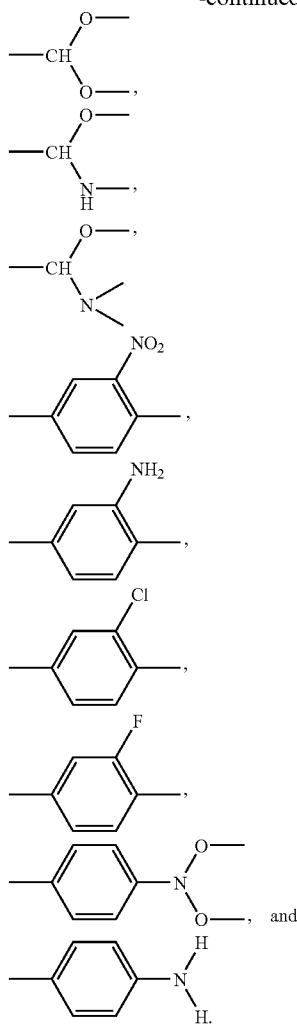

Figure 3:
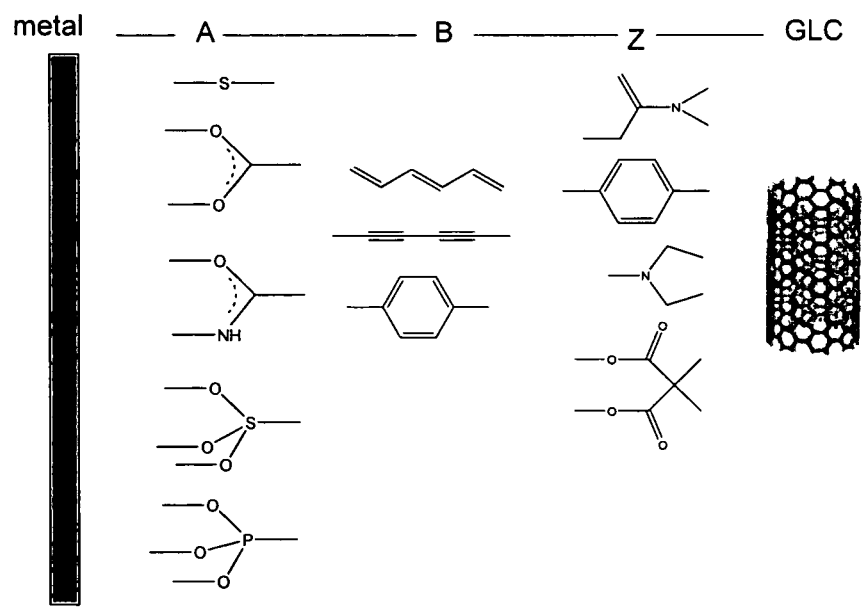
FIG. 3 shows a schematic representation of a structure according to an embodiment of the present disclosure, wherein formulas of various possible linkers is illustrated.
Figure 4:
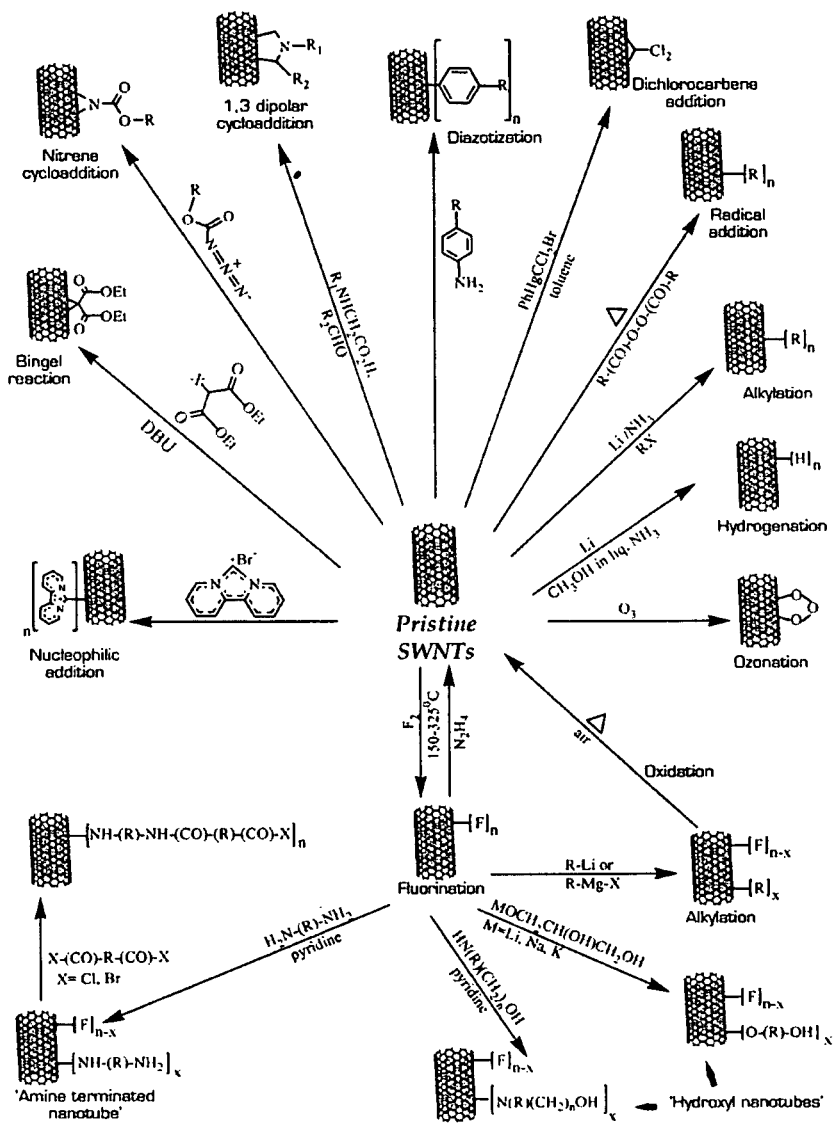
FIG. 4 shows a schematic representation of a structure according to an embodiment of the present disclosure, wherein formulas of various possible linkers is illustrated.
Figures 7, 8:
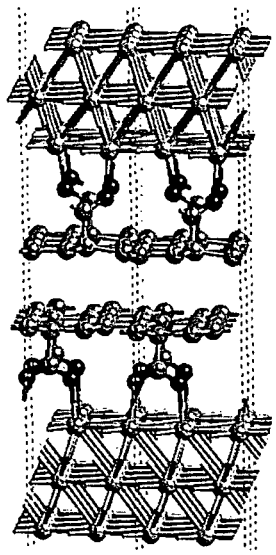
FIG. 7 shows a sandwich slab structure for use with the embodiment of FIGS. 5 and 6.
FIG. 8 shows the mathematical expression of a function for use with the experiment of FIGS. 5-7.

Exemplary embodiments of the structures herein disclosed are illustrated in FIG. 3 and in the known FIG. 4 [see FIG. 7, from reference 76], wherein in the formulas of FIG. 4, R is C is any moiety and n is an integer.

According to one of the embodiments of the present disclosure, the GLC is first prepared with some density of such pendent groups on the GLC to form the mono functionalized GLC (hereafter m-GLC) according to a strategy identifiable by a skilled person upon reading of the present disclosure. Applicants expect that a suitable coverage might be from 1/1000 to 1/3 (above 1/3 might be a problem because of steric interactions) with a range of 1/10 to 1/100 likely to be best.

Alternatively, for an oxide electrode or support, eliminating the H might accompany forming a support-A-B-Z-GLC bond and similarly for other electrodes. This then leads to a strongly bound ES-GLC interface stitched together by the functional anchor. Examples of such functional anchors A-B-Z are given in FIG. 3.

The strong covalent bonding necessarily leads to improved electrical contact with reduced contact resistance. In particular, a very dramatic decrease in contact resistance occurs when the functional anchor has a planar component with pi bonds that can couple near the Fermi energy with the conduction and valence band electrons of the GLC and of the ES.

In some embodiments, the conducting material is a metal and the metal can be platinum, copper, palladium, gold, silver, ruthenium, and nickel.

The functional anchors according to the present disclosure can improve the properties for any ES-GLC interface. However, particularly useful is the application for the case in which ES=Cu, Au, Pt, which are commonly used for various applications in microelectronics, nanoelectronics, nanotechnology, fuel cells, solar cells, and related technologies. Thus the functional anchors of the present disclosure can improve the properties for Cu to be superior to that of Pd (without an anchor), allowing continued use of this material in microelectronics.

In some embodiments, the functional anchors can be selected from —SH, —OH, —NH$_2$, —COOH, —CONH$_2$, —SO$_3$H. In some of those embodiments, such functional groups are expected to lose hydrogen atoms as they attach to the metal surface, making a strong covalent bond that should provide good electrical contact (small contact resistance) between the CNT and metal while also providing a good mechanical connection (preventing thermal diffusion of the carbon nanotubes) as exemplified in Example 1 for a Pt contact electrode.

In accordance with the present disclosure, the functional anchors herein described can be used to tie together a conducting material and a GLC in an ES-GLC interface, which can be part of various devices, structures and systems.

In particular, in some embodiments, the structure herein described can be used in an ES-GLC interface in electronic applications and more particularly in an integrated circuit. In electronics, an integrated circuit (also known as IC, microcircuit, microchip, silicon chip, or chip) is a miniaturized electronic circuit (consisting mainly of semiconductor devices, as well as passive components) that is manufactured on the surface of a thin substrate of semiconductor material. Integrated circuits are used in almost all electronic equipments currently in use, and have revolutionized the world of electronics.

According to some embodiments, an integrated circuit is therefore disclosed that comprises a structure herein disclosed. In particular, in the integrated circuit at least one interconnect layer can comprise a graphene like carbon and at least one electrode can comprise a conducting material. In the integrated circuit, the graphene-like carbon and the conducting material can be linked by a functional linker herein disclosed.

In some embodiments, the integrated circuit can comprise additional element including but not limited to a substrate and in particular a crystalline semiconductor substrate, one or more electronic and/or optical devices, which might include electrodes, elements formed by dielectric material, e.g. dielectric layers, and interconnect layers. In some embodiments, the interconnect layers can connect electronic devices according to a predetermined pattern, and/or at least one interconnect layer comprises an organic anchor.

A crystalline semiconductor substrate can be formed by a thin slice of semiconductor material, such as a silicon crystal, used in the fabrication of integrated circuit and other microdevices.

An electronic device can be any physical entity in an electronic system whose function is to affect the electrons or their associated fields in a desired manner consistent with the intended function of the electronic system. Devices are generally intended to be in mutual electromechanical contact, usually by being soldered to a printed circuit board (PCB), to create an electronic circuit with a particular function (for example an amplifier, radio receiver, or oscillator). Devices may be packaged singly or in more or less complex groups as integrated circuits.

A dielectric material can be formed by a nonconducting substance, i.e. an insulator. Dielectric layer is usually used for isolating components or structures in the active circuit from each other, and as dielectric structures for MOS transistors, capacitors, and the like. Interconnect layer for a semiconductor device can be formed in a region located on an opening by depositing graphene-like material such as carbon nanotubes.

Functional anchors suitable to be used in an integrated circuit include any functional linker herein disclosed and in particular an organic functional anchor particularly suitable for enhancing the electrical contact and/or minimize contact resistance with a conducting material linked to the anchor.

In some embodiments, an integrated circuit can be manufactured by: providing an electrode that is formed at least in part by a conducting material, providing at least one interconnect layer comprising a graphene-like carbon, such as a carbon nanotube; providing a functional linker able to linker the conducting material and the carbon nanotube and contacting the functional linker with the interconnect layer and the electrode thus forming an interconnect layer-functional linker-electrode structure the structure forming the integrated circuit.

In some embodiments an integrated circuits can be manufactured by a method comprising
  providing a semiconductor surface
  forming an electronic device on the semiconductor substrate, e.g. by depositing a conducting material on the substrate to form an electrode;
  forming a dielectric layer on the semiconductor substrate, and
  forming an interconnect layer on the semiconductor substrate, e.g. by depositing the interconnect layer on the substrate,
  wherein at least one of the interconnect layers deposited comprises a graphene like carbon material, e.g. a nanotube composition,
  wherein the nanotube or other graphene-like carbon material is linked to the electronic device by a functional anchor and in particular an organic anchor, and wherein
  the substrate comprising the electronic device, the dielectric layer and the interconnect layer being part of the integrated circuit The method to manufacture the integrated circuit can also comprise dicing the integrated circuit and, possibly, packaging the resulting diced integrated circuit.

Figure 31:
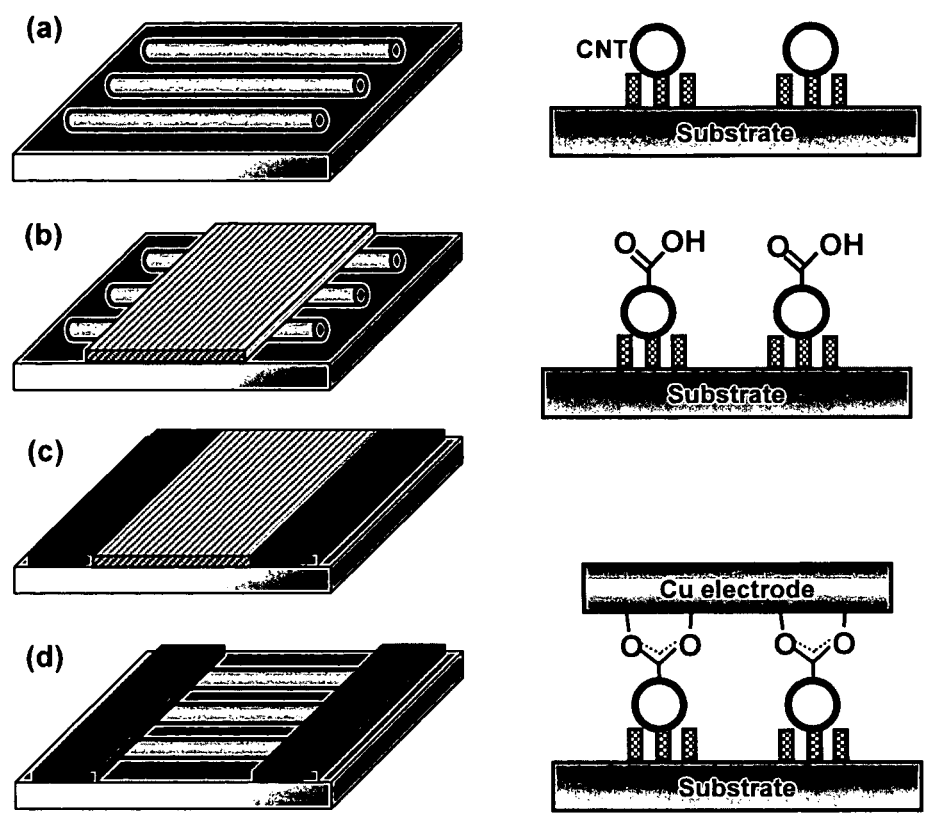
FIG. 31 shows an outline of processing steps that might be used to implement the assembly of CNT-anchor-Cu electrode systems of the present disclosure.

An exemplary embodiment that might be used to implement the assembly of CNT-anchor-Cu electrode systems is illustrated in example 7 and related FIG. 31. There have been studies which reported ways to implement the CNTs at a specific place on the wafer by functionalizing the CNTs or by functionalizing the surface of the substrate or both. Some of the functional molecules from the CNT surface can be successfully removed, and pristine CNTs are restored (Panel a). After this process, the CNTs can be masked for the implementation of the electrodes to avoid unfavorable deformations of the CNTs (Panel b), followed by treatment with anchor precursors Panel c).

In some embodiments, the nanotubes can be manufactured in a separate process prior to being deposited on the semiconductor substrate. In some embodiments, the method to manufacture an integrated circuit further comprises a step of chemical-mechanical polishing of the semiconductor substrate at some point after deposition of an interconnect layer.

According to a further embodiment of the present disclosure, use of the functional molecular anchors is shown for nanostructured fuel cell electrocatalysts. In particular in some embodiments, a fuel cell is described that comprises an anode, a proton exchange electrolyte membrane, and a cathode, wherein the anode and/or the cathode comprise organic anchors. The wording "fuel cell" as used herein indicates an electrochemical conversion device. It produces electricity from fuel (on an anode site) and an oxidant (on a cathode side), which react in the presence of an electrolyte. The reactants flow into the cell, and the reaction products flow out of it, while the electrolyte remains within it. Fuel cells can operate virtually continuously as long as the necessary flows are maintained.

An anode is an electrode through which (positive) electric current flows into a polarized electrical device. A cathode is an electrode through which (positive) electric current flows out of a polarized electrical device.

In fuel cell system, a proton exchange electrolyte membrane having first and second sides and wherein said first side is contiguous with the second side of said anode screen electrode, i.e., interposed between the anode and cathode.

Figure 32:
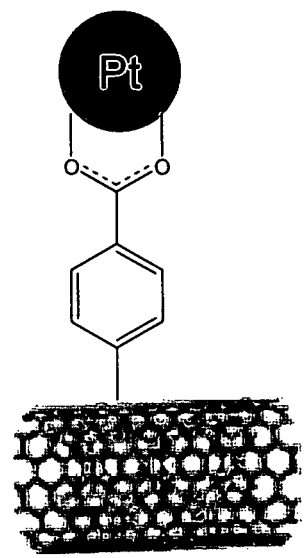
FIG. 32 shows a structure according to an embodiment of the present disclosure suitable to be included in a fuel cell.

In some embodiments, the fuel cell includes a catalyst and the same or another functional linker used to link at least one of the electrodes (anode and/or cathode) can also be used to link a catalyst. In some embodiments, the functional linker is an organic linker. In some embodiments, the functional linker and in particular, an organic linker is comprised in the fuel cell to link a catalyst support and a Pt nano-catalyst to form a fuel cell electrode catalyst (see the exemplary schematic illustration of FIG. 32.

In some embodiments, the organic anchors are to link catalysts and catalyst supports within the anode and/or the cathode.

In some embodiments, the anode reaction performed in fuel cell herein disclosed is a reduction of hydrogen.

In some embodiments, the anode reaction performed in fuel cell herein disclosed is a reduction of methanol.

In some embodiments, the fuel cell further comprises an anode current collector. In some embodiments, the fuel cell further comprises manifolds which deliver fuel and oxidant to the anode and cathode respectively. In some embodiments, the anode, electrolyte membrane, and cathode form a membrane electrode assembly with a thickness of no more than about 300 μm. In some embodiments, the catalyst support comprises between 25 wt. % and 35 wt. % catalyst.

EXAMPLES

The structures, methods and systems herein disclosed are further illustrated in the following examples, which are provided by way of illustration and are not intended to be limiting the scope of the present disclosure. The experimental setup and materials used for the following examples are described in Section S2 of Annex A, which forms part of the present disclosure and is incorporated by reference in its entirety.

Example 1

Functional Organic Linker Linking a Pt Electrode and a Carbon Nanotube

To study the interface structures and anchor energies, Applicants used, in the embodiment here described, a three-layer 2×2 Pt 111 slab to represent the Pt surface and a single graphene sheet to represent the carbon nanotube surface. These two surfaces were connected using various molecular anchors, with one anchor per cell. Applicants then optimized the structures for the Pt-slab-anchor-graphene system while fixing the two bottom layers of Pt atoms.

What is desired is that both the graphene-anchor bond and the anchor-Pt bond are strong for a good anchor of the Pt particle to the CNT surface.

Applicants used first principle simulations (i.e. simulations starting directly at the level of established laws of physics and does not make assumptions such as model and fitting parameters) to predict (1) the structure of the CNT-anchor-metal interface, (2) interaction energies between anchor and CNT and between anchor and metal, and (3) the contact resistance between the CNT and metal for various anchors.

The following functional groups were considered by Applicants, —SH, —OH, —NH$_2$, —COOH, —CONH$_2$, —SO$_3$H. Such functional groups are expected to lose hydrogen atoms as they attach to the metal surface, making a strong covalent bond that should provide good electrical contact (small contact resistance) between the CNT and metal while also providing a good mechanical connection (preventing thermal diffusion of the carbon nanotubes).

Figure 6:
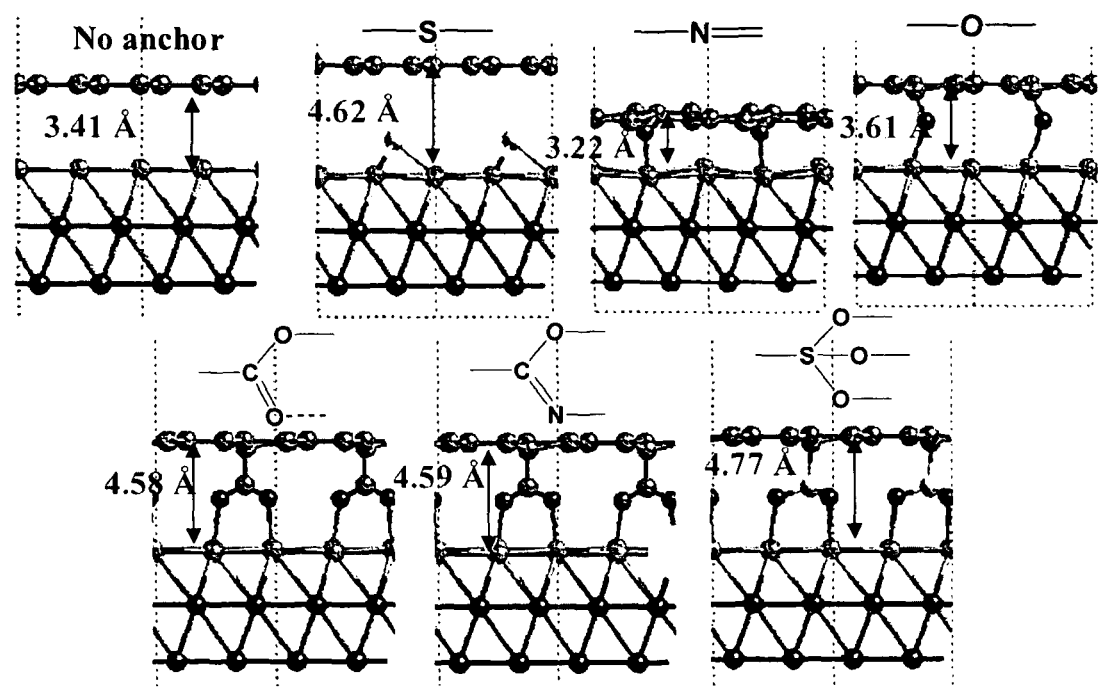
FIG. 6 shows anchor structures related to the experiment of FIG. 5.

Applicants' results are shown in the exemplary table of FIG. 5 and in FIG. 6.

The sequence for anchor energies is

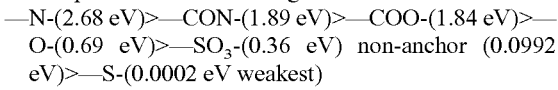

According to the results illustrated in FIGS. 5 and 6, the N anchor has the closest distance and also the strongest anchor energy. The S anchor shows that the bond between S—Pt is strong enough to grab the sulfur atoms from the carbon surface. The chemical bond between S and carbon is broken. The conjugated anchors such as —COO— and —CON— have very good anchor energies.

To determine the contact resistance of FIG. 5 for various anchors, Applicants formed the sandwich slab structure shown in FIG. 7 (a simulation model that comprises 2 metal electrodes, 2 organic anchor layers and 2 graphene layers) and calculated the current/voltage performance (resistance) by combining Green function's theory [16-21] with a DFT Hamiltonian. This leads to the function shown in FIG. 8, where T(E,V) is the transmission function of the anchor.

The sequence for the contact resistance near zero bias is:

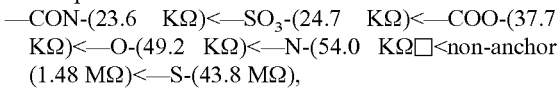

Figure 9:
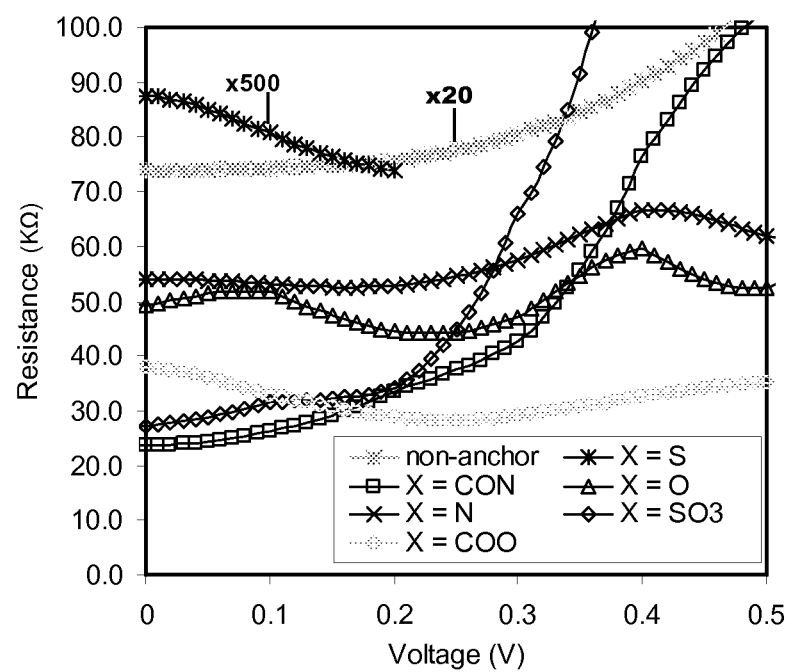
FIG. 9 shows a graph of bias voltage v. contact resistance for the anchors of FIG. 6.

A graph of bias voltage v. contact resistance for the above anchors is shown in FIG. 9. Without anchor there is a large contact resistance because of the lack of chemical bond between the CNT and the metal contact. All cases with chemical bonds enhance the contact conductivity dramatically. Moreover, the π conjugation anchors such as —CON—, and —COO— lead to the lowest contact resistance. This is because the delocalized frontier molecular orbitals of π conjugated anchors provide better coupling to the conduction orbitals of the electrodes [19]. Moreover, the bond energetics of C-anchors and Pt-anchors also contribute to the contact conductivity as long as they have same binding characteristic. Involving both σ and π binding characteristics, stronger anchors such as —CON— including both sigma and π binding would provide higher conductivity than weaker anchors such as —COO—.

Therefore, it appears that the —COO— and —CON— anchors are the best functional anchors to link carbon nanotubes and Pt metal contact. This strategy with these anchors should be useful for both single wall and multi wall nanotubes and also for similar graphene and graphite applications.

Example 2

Nanostructured Fuel Cell Electrocatalysts

Applicants demonstrated use of the functional molecular anchors for nanostructured fuel cell electrocatalysts, according to the experimental approach set forth below.

Since the ohmic contact is one of the major reasons to lose fuel cell efficiency [see reference 29], Applicants suspected that part of the problem might be the contact resistance between the CNT and the metal catalysts particles, which can be as high as 500 K$\Omega$ without post treatment [see reference 30]. In addition, Applicants were concerned that the Pt nanoparticles might not be sufficiently anchored to the CNT surface, allowing them to diffuse and eventually aggregate into large Pt NPs, which would have much reduced surface area [see reference 31].

To alleviate such potential problems, functional molecular anchors can be used to connect Pt nanoparticles (NPs) to multi-walled carbon nanotubes (MWCNTs) both mechanically and electrically. Anchors based on such functional groups as —SH, —OH, —$NH_2$, —COOH, —$SO_3H$, —$CONH_2$ were considered, all of which can be attached to MWCNT surfaces. As already mentioned above, these functional groups are expected to lose hydrogen atoms as they attach to the metal surface, making a strong covalent bond that should provide good electrical contact (small contact resistance) between the CNT and metal particle while also providing a good mechanical connection (preventing aggregation of the nanoparticles).

Therefore, Applicants carried out experiments by synthesizing electrocatalysts in which metal nanoparticles were attached to various anchors bonded to MWCNT and tested the electrocatalytic activity using a rotating disk configuration. Four MWCNTs samples with various anchors labeled as:

1. MWCNT-SH (1.0 wt % functional groups including 90% SH and 10% —$SO_3H$),
2. MWCNT-$NH_2$ (0.6 wt % functional groups including 50% —$NH_2$ and 50% —$CONH_2$),
3. MWCNT-purified (3.5 wt % mixed —COOH and —OH), and
4. MWCNT-COOH (4.5 wt % mixed —COOH and —OH), ordered from Nanocyl, were loaded with Pt NPs by the ethylene glycol method [see reference 35].

Figure 10:
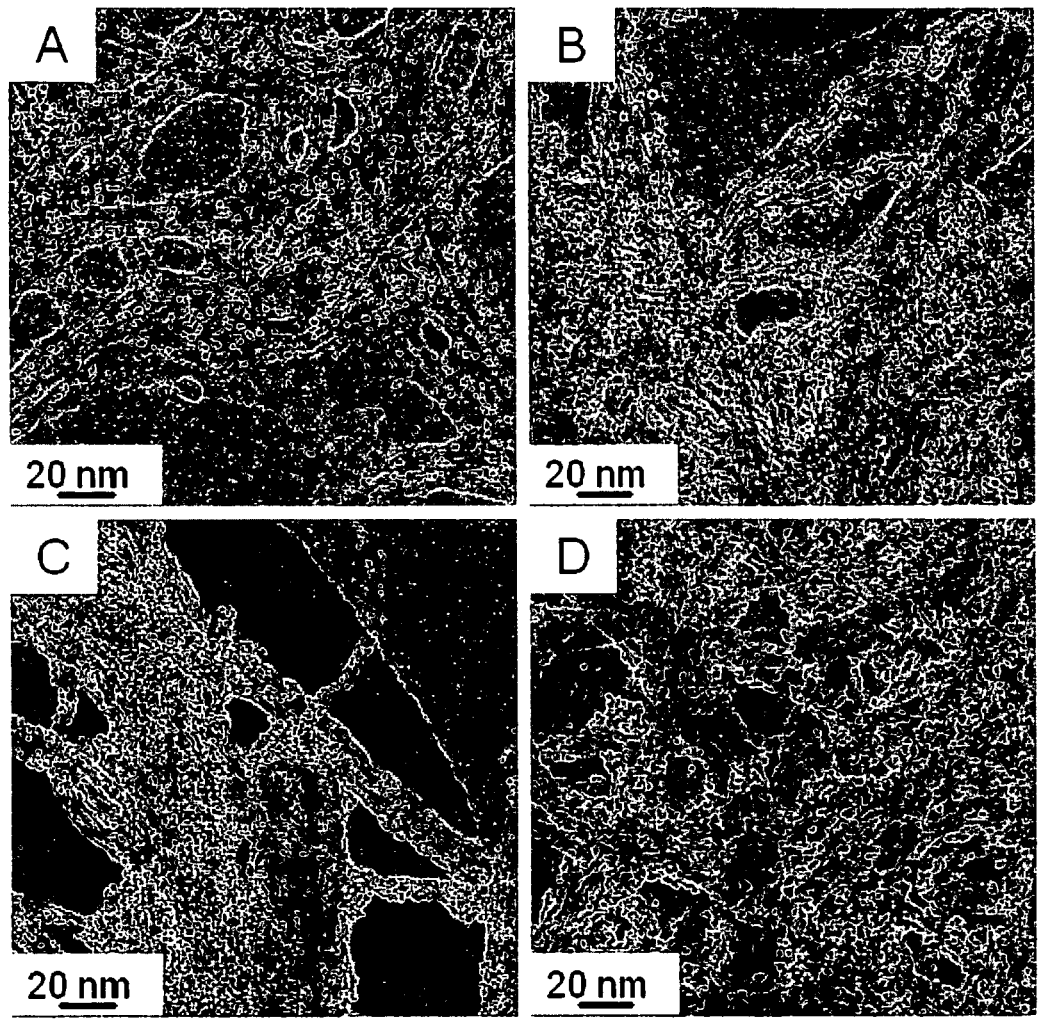
FIG. 10 shows microscope images of Pt loaded on multi-wall carbon nanotubes.

FIG. 10 shows TEM (transmission electron microscope) images A, B, C and D of Pt loaded on MWCNT-SH, MWCNT-purified, MWCNT-COOH and MWCNT-$NH_2$. In FIG. 10 the dark spots are identified as Pt NPs by energy dispersive analysis of x-rays (EDAX) analysis, and more aggregation of Pt NPs for MWCNT-SH than that for others.

Figure 11:
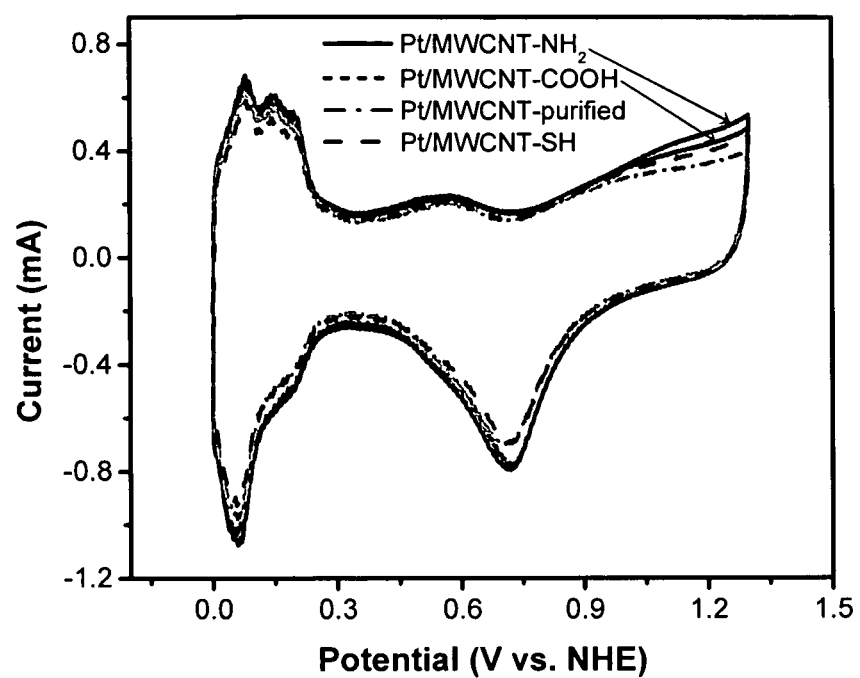
FIG. 11 shows a graph used to determine active surface areas of Pt.

To further characterize the relative Pt dispersion for various anchors, Applicants used cyclic voltammetry (CV) experiments to determine the active surface areas of Pt supported on these MWCNTs samples, as shown in FIG. 11. Using the calculated areas under the desorption peaks of hydrogen (from 0.05 to 0.37 V vs. NHE) and correcting for double layering charging effects Applicants have found that Pt/MWCNT-$NH_2$ with —$NH_2$ and —CON— groups have the largest electrochemical surface area (72 $m^2/g$), followed by Pt/MWCNT-COOH with 67 $m^2/g$, Pt/MWCNT-purified with 65 $m^2/g$, and 56 $m^2/g$ for Pt/MWCNT-SH. These results are in agreement with the observations of dispersion of Pt NP on anchored MWNTs.

The specific catalytic activity of the samples for the oxygen reduction reaction (ORR) was examined by potentiodynamic measurements at 5 mV/s using the same electrochemical setup with $O_2$ saturating the electrolyte. To compare these systems the curves (see FIG. 12) were normalized by the electrochemical surface area of Pt, obtained from the CV (FIG. 11).

Figure 12:
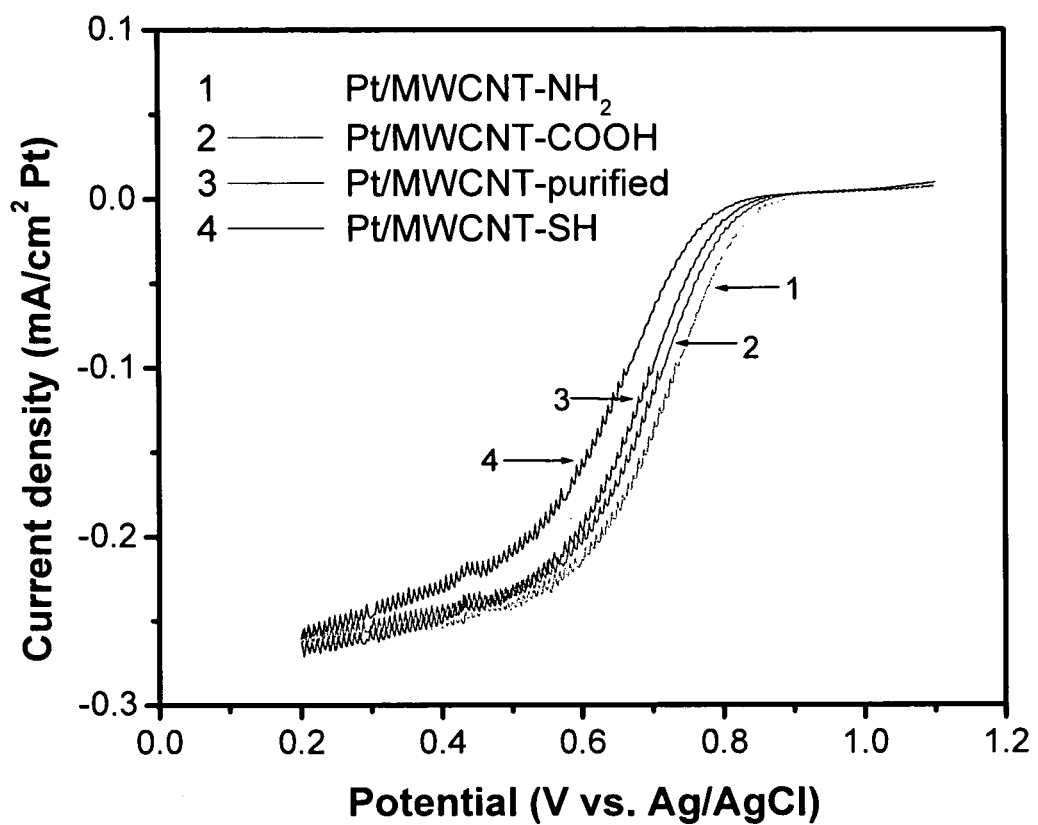
FIG. 12 shows a series of normalized comparative curves to examine specific catalytic activity of four samples.

FIG. 12 shows that the measured curve shifts positively in the sequence:

Pt/MWCNT-SH<Pt/MWCNT-purified<Pt/MWCNT-COOH<Pt/MWCNT-$NH_2$, indicating that the catalytic activity of ORR increases in the same order. Such differences are clearly identified by the half wave potential measurement (0.636V<0.675V<0.688V<0.711V), showing the same trend as the differences in dispersion from CV (FIG. 11). Since the surface areas of all samples have been normalized, the difference ORR curve is expected to contribute from the intrinsic contact resistances between metal and nanoparticles.

Based on the experimental and simulation results similar to the ones conducted in the previous example, Applicants demonstrated that the electric-catalysts system of MWCNT-CON—Pt has the best performance among MWCNT-anchor-Pt which anchors can be —CON—, —N—, —COO—, —O—, —$SO_3$— and —S—. Especially, current MWCNT-anchor-Pt sample with 1 wt % mixture —CON— and —N— anchors is already 33% better than MWCNT-anchor-Pt with 4.5 wt %—COO-anchors considering the cyclic voltammetry curve in FIG. 11. One can expect that 4.5 wt % pure —CON— anchored MWNTs would be four times better than current samples. These findings may provide the direction to further improve the catalytic activity.

The enclosed Annex A, which makes part of the description of the present application, shows some additional information with particular reference on the fuel cell embodiment of the present application. Section S1 of Annex A describes the computation and theoretical methodologies. Section S2 describes the experimental procedures. Section S3 describes detailed computation results.

Example 3

Functional Organic Linker Linking a Cu Layer and a Carbon Nanotube or Graphene

In the background section of the present application, a problem with metal contacts made of Cu has been addressed. The present disclosure provides embodiments where such problem can be solved by incorporation of the functional linkers or "anchors" similar to those shown in the previous embodiments. The anchors can bond covalently to the Cu, decreasing the contact resistance, while increasing the mechanical stability. The following embodiments further illustrate synthetic strategies that might be useful for incorporating the Cu-anchor-GLC elements into nanoelectronics.

In the next three paragraphs the modeling details of these additional embodiments will be initially discussed.

Figure 13:
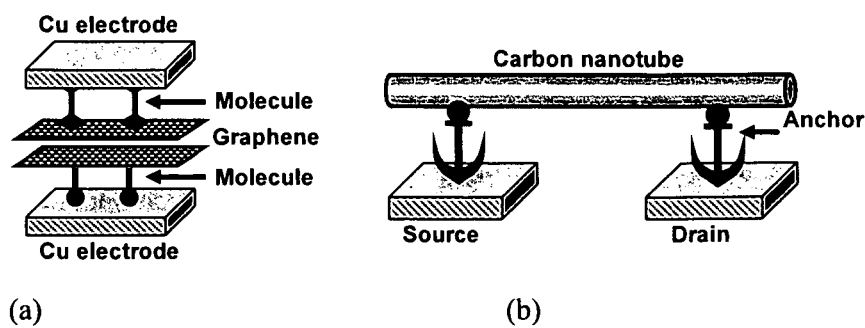
FIG. 13 shows a further schematic view of the functional molecular anchors of the present disclosure.

A Cu-anchor-graphene configuration is schematically shown in FIG. 13. FIG. 13(a) shows a schematic perspective view of the configuration, while FIG. 13(b) shows a simplified model of the concept.

The total resistance of a CNT ($R_T$), is often expressed as $R_T=R_C+R_{NT}$+scattering, where $R_{NT}$ represents resistance of CNT. [see reference 61] For the simple model of FIG. 13, $R_T=R_C+R_G$, where $R_G$ is the contact resistance of two layers of graphene with a fixed distance of 3.4 Å and $R_C$ is the contact resistance used by Applicants for each of the different anchors of these embodiments. The scattering term can be ignored since the distance is much smaller than the mean free path of an electron. Additionally, Applicants have found that metal-graphene models accurately represent metal-CNT models for all geometric considerations except for the distance between the CNT and electrodes which is slightly smaller (1.9-2.8%) than the graphene case, indicating that the larger attractive interaction is due to the incursion of the s hybrid character in the pit orbital caused by the curvature of the CNT.

The model geometries were optimized using the following steps: (1) Cu-anchor models were optimized to find the most stable binding sites and molecule species of the anchor molecules on a Cu(111) surface. For acetylene, carboxyl, and amide anchors, the $CH_3$ group was attached at the end of the anchor molecules to replace the carbon on the graphene in the following step (3). (2) Graphene-anchor models, including the effects of the resonance positions, were fully optimized. (3) Cu(111)-anchor-graphene models for the current-voltage (I-V) calculations were fully optimized.

Applicants chose an exemplary 4×4 unit cell (32 carbons per layer) of a graphene sheet (fixed at 0.98×0.85 $nm^2$) to have large enough spacing to avoid interactions between anchor molecules. The QM optimized Cu(111) layers with ABC stacking (FCC) deposited on top of a graphene sheet, were used to represent Cu metal layers so that the periodic spacing of Cu metal matched with the graphite surface. The Cu—Cu distances of the deposited Cu layers is within 5% of the nearest neighbor distance of the bulk crystal structure. For all optimizations, three layers of Cu were used with the second and third layers being held fixed.

The choice of anchors for these embodiments will now be described. In particular, Applicants chose simple functional groups, such as aryl (—$C_6H_4$—), acetylene (—CC—), amide (—CONH—) and carboxyl (—COO—), as anchor candidates to bind between Cu surfaces and CNTs. All anchor candidates have been reported to functionalize CNT sidewalls in experiments. [see references 62-65] A variety of aryl functionalized CNTs can be synthesized by using aryldiazonium salts and the estimated degree is one out of approximately 20 carbons [see reference 63] or even up to 9 carbons [see reference 64], which can lead to a increase in solubility in organic solvents. The alkylated CNTs are synthesized using lithium and alkyl halides in liquid ammonia, which are soluble in common organic solvents. [see reference 65] The carboxyl groups can be introduced on the CNTs by sonicating in 3:1 sulfuric/nitric acid solvents for three hours at 40 degrees C. and further treatment by ethylenediamine and the coupling agent produces the amido functionalized CNTs. [see reference 64]

With reference to the computational aspect of these embodiments, Applicants used SEQQUEST [see reference 66], a fully self-consistent Gaussian-based linear combination of atomic orbitals (LCAO) density functional theory (DFT) method with double-ζ plus polarization (DZP) basis sets. [see reference 67] All calculations were based on the Perdew-Burke-Ernzerhof (PBE) generalized gradient approximation (GGA) with PBE pseudo atomic potentials and spin polarization within 2D periodic boundary conditions. [see reference 68] The k-point sampling of 4×4 in the Brillouin Zone and the real space grid interval of 53×60 in the x-y plane, for a grid spacing of 0.30 per point, were carefully determined by energetic convergence.

To obtain I-V characteristics of each model, the density of state (DOS) was obtained from DFT quantum mechanics, while the transmission coefficient was obtained using non-equilibrium Green's function theory with DFT. [see reference 69] The transmission function was then used in the Landauer-Buttiker formula to calculate the I-V characteristics. The total resistance of these systems was then obtained from the zero-bias transmission.

Example 4

Optimization of the Cu-Anchor Models

Figure 14:
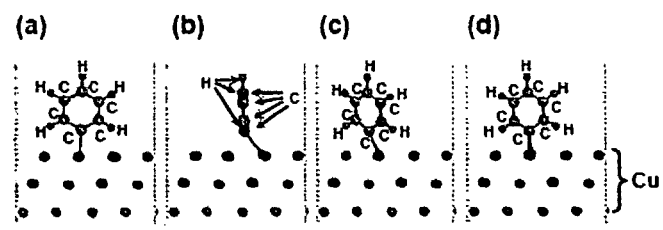
FIG. 14 shows a series of representations for modeling of a Cu-benzene anchor.

For the modeling of the Cu-benzene anchor, Applicants optimized the geometries of benzene ($C_6H_6$) on top of Cu atom (atop), face-centered cubic (fcc), hexagonal close-packed (hcp) and bridge site to find the most stable binding site on the Cu(111) surface, as shown in FIG. 14. When bonding the benzene to the Cu(111) surface, one hydrogen atom is removed from benzene, forming a phenyl. Applicants calculated snap bond energies and difference in the energies (relative energies) in which the lowest energy is defined as 0 kcal/mol, as shown in the table of FIG. 15. The most stable binding site on Cu(111) for $C_6H_5$— is found to be at the bridge site with a bond energy of 46.9 kcal/mol, which is slightly more favorable than the hcp site by 0.4 kcal/mol, the fcc site by 1.6 kcal/mol, and the atop site by 1.7 kcal/mol. The perpendicular separation between the Cu(111) surface and anchor is 1.81 Å at the bridge site, which is the smallest of all the anchors.

Figure 16:
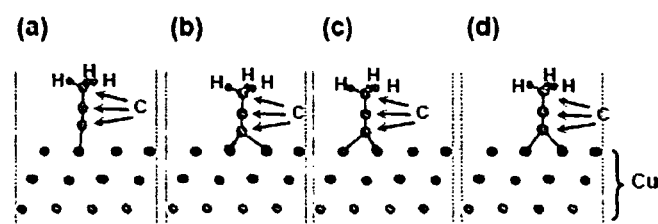
FIG. 16 shows a series of representations for modeling of a Cu-propyne anchor.
Figures 17, 18:
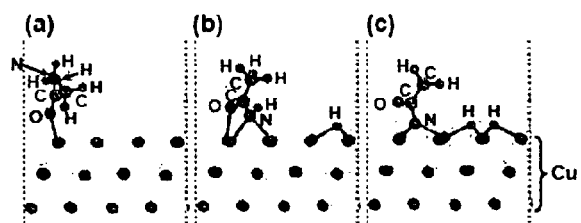
FIG. 17 shows a table with snap bond energy results for the modeling of FIG. 16.
FIG. 18 shows a series of representations for modeling of a Cu-amyde anchor.

In a similar manner to the benzene modeling, the acetylene anchor with optimized geometries for propyne (($CH_3$)CCH) on atop, fcc, hcp, and bridge sites were used to find the most stable binding site on Cu(111) by removing one hydrogen atom bonded to the acetylene, as shown in FIG. 16. The methyl, bounded at the end of the acetyl to replace the carbon on the graphene, is used to clarify the bond directions. Applicants again calculated snap bond energies and delta energies in which the highest energy is defined as 0 kcal/mol, as shown in the table of FIG. 17. The most stable binding site on Cu(111) for propyne is found to be at the fcc site with a bond energy of 103.5 kcal/mol, which is slightly more favorable than the hcp site by 0.7 kcal/mol and is much more stable than the atop site by 14.7 kcal/mol, indicating that the three-fold sites provide a preferable overlap of the orbitals between Cu on Cu(111) surface and carbon on propyne. The perpendicular separation between Cu(111) surface and the anchor is 1.37 Å at the fcc site, which is the smallest distance for all the anchors.

For the amide anchor, ($CH_3$)$CONH_2$ on top of Cu(111) surface with and without hydrogen atoms were optimized to choose the most stable molecule which bonds to the Cu(111) surface, as shown in FIG. 18. The snap bond energies and delta energies were calculated, as shown in the table of FIG. 19. One hydrogen atom is placed on the Cu surface for the ($CH$)$_3CONH$ model and two hydrogen atoms are placed on the Cu surface for the ($CH_3$)$_3$CON to enable comparison of the total energies of all the models. Applicants found that ($CH_3$)CONH bonds to the Cu(111) surface with the snap bond energy of 122.2 kcal/mol, which is more energetically favorable than ($CH_3$)$CONH_2$ and ($CH_3$)CONH. In the ($CH_3$)CONH model, the O atom is on the top of the Cu atom, the N atom is in the bridge position between two Cu atoms and the perpendicular separation between Cu(111) surface and anchor is 1.58 Å.

For the carboxyl anchor, ($CH_3$)COOH on top of Cu(111) surface with and without a hydrogen atom were optimized to choose the most stable molecule which bonds to the Cu(111) surface, as shown in FIG. 20. One hydrogen atom was added to the surface of Cu(111) for the $(CH_3)COO$ model to compensate for the missing hydrogen atom and enable a comparison of the total energy with $(CH_3)COOH$ by calculation of the snap bond energies and delta energies, as shown in the table of FIG. 21. Applicants found that the $(CH_3)COOH$ molecule does not bond to the Cu(111) surface due to the stability of the molecule itself, which also confirms that the calculations are being carried out reasonably. On the contrary, $(CH_3)COO$ bonded to the Cu(111) surface with a snap bond energy of 70.3 kcal/mol, with one O atom on the top of the Cu atom and the other O atom in the bridge position between two Cu atoms, with a perpendicular separation between Cu(111) surface and anchor of 1.75 Å.

Example 5

Optimization of Graphene Anchor Models

Figure 22:
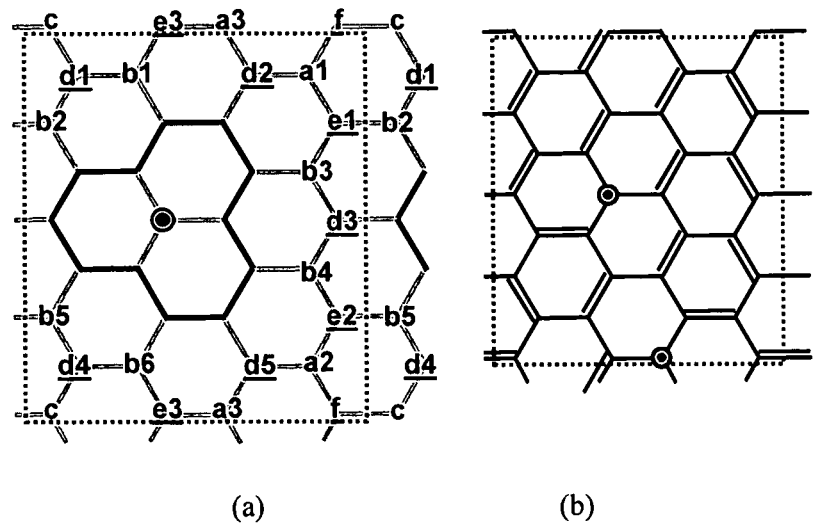
FIG. 22 shows ethylene placed on a graphene unit cell.

Previous theoretical studies reported that chemically bonding of an anchor to the side wall of a CNT creates a half-filled band near the Fermi energy because of an unpaired spin of a $p\pi$ orbital of a carbon-carbon bond. [see references 70-71] Since I-V characteristics at the interface are a critical issue and the unrealistic half-filled band near the Fermi energy can cause overestimation of the conductance, Applicants carefully studied the anchors with or without unpaired spin to determine which are energetically favorable on the unit cell of graphene sheet when including the resonance effects. To examine this issue, the energetic in adiabatic and snap bond energy between resonance and non-resonance positions were calculated by bonding two ethylene molecules $(C_2H_2)$ on the graphene sheet and removing one hydrogen atom. The graphene unit cell consists of 32 carbon atoms with a fixed area of 0.98×0.85 $nm^2$. When placing one ethylene on the graphene unit cell (shown in circle in the middle of FIG. 22(a)), there are nine resonance positions (a, b and c) and nine non-resonance positions (d, e, and f). Each alphabet notation represents the equivalent positions in the resonance or non-resonance positions. For example, when the second ethylene is bonded on a2 site as shown in FIG. 22(b), which is equivalent to positions a1 and a3, the two ethylene molecules are in resonance positions. Second ethylene positions which are smaller than 2.8 Å from the first ethylene position are not considered in order to avoid the large steric interactions between molecules.

Figure 23:
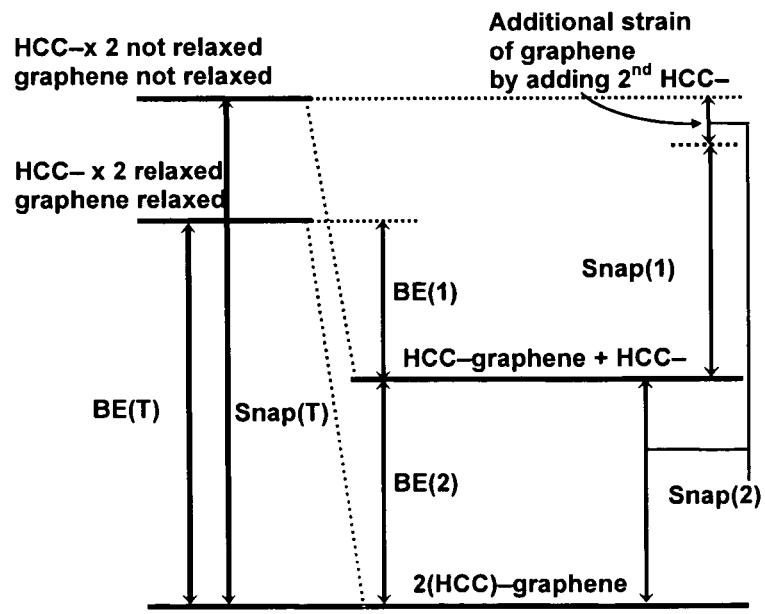

To summarize the computation results, the adiabatic and snap bond energies measured by adding one ethylene and two ethylene molecules are shown in the chart of FIG. 23 and the table of FIG. 24. According to FIG. 24, the adiabatic bond energy of the second addition of the ethylene molecule at resonance positions is larger than those of the first ethylene molecule by 13.0 kcal/mol, but that of non-resonance positions is smaller than the first ethylene molecule by 4.4 kcal/mol. Additionally, the adiabatic bond energy at the resonance positions is more stable by 17.4 kcal/mol than those at the non-resonance positions on average. Applicants used the adiabatic bond energetic to exclude the significant effect of the strain energetic in the graphene sheet. It is clear that the addition of the second anchors in the resonance position stabilize the total anchor-graphene models. Thus, a hydrogen atom is added in the resonance position on a graphene unit cell for all anchor calculations to avoid creating an unrealistic half-filled band or a lowest unoccupied molecular orbital (LUMO) which affects the quantum mechanical current-voltage (I-V) calculations.

By taking into account the resonance effect which is described above, the graphene-anchor models were optimized by removing one hydrogen atom from each anchor and placing it on the resonance position (a3) of the graphene unit cell shown in FIG. 25. For all anchors, atop sites were found to be favorable. The snap bond energetic between the anchor and graphene, and the graphene strain energetic, which is due to the deformation of the graphene sheet by bonding both the anchor and H atom, are shown in the table of FIG. 26. The largest snap bond energy is for acetylene with 82.6 kcal/mol, followed by benzene (58.9 kcal/mol), carboxyl (50.5 kcal/mol), and amid (42.0 kcal/mol). The acetylene anchor showed a significantly smaller snap bond energy than the benzene and the graphene strain energy in the acetylene model is slightly larger than the other models. These results also support the strong interaction at the acetylene-graphene interface.

Optimization of Cu(111)-anchor-graphene models and construction of I-V models will now be discussed. In particular, Applicants fully optimized the geometries of the Cu(111)-anchor-graphene models obtained from the above paragraphs. The total snap bond energy is the largest for acetylene anchor (168.9 kcal/mol) of all four anchors, followed by carboxyl (123.9 kcal/mol), amide (117.8 kcal/mol), and benzene (106.1 kcal/mol), as shown in the table of FIG. 27. The perpendicular separations between Cu(111) surface and graphene is significantly larger for benzene (7.03 Å) due to its configuration, while the rest of the separations have similar values. Looking at the results in more detail, the benzene-Cu (111) surface is 1.97 Å, which is 0.64 Å larger than the acetylene-Cu surface separation, and the benzene-graphene separation of 1.58 Å is 0.10 Å larger than the acetylene-Cu surface separation. The amide-graphene separation (1.62 Å) is similar to the carboxyl-graphene separation (1.64 Å), although the amide-Cu surface separation (1.88 Å) is smaller than the carboxyl-Cu surface separation by 0.15 Å.

To enable a direct comparison of the contact resistance at the interface between each anchor model and graphene, the I-V models were constructed from the optimized geometries by reversing one of the models and placing it at the AB stacking positions of the original graphene sheet as shown in FIG. 28. The three Cu(111) layers represent the two electrodes (source and drain) of a CNT or SGS. The Cu contacts without anchor was calculated as discussed in [see reference 50], see FIG. 28(e). The distance between the two graphene sheets was fixed at 3.4 Å, which is specified by the experimental data. [see reference 72].

The contact resistance of the Cu(111)-anchor-graphene models will now be discussed. For all anchor models, the DOS (FIG. 29(a)) of carbon are larger than the no anchor model, indicating improved conduction channels at the interface. The transmission coefficients near the Fermi energy (FIG. 29(b)) and the strength of the amide, carboxyl, acetylene, no anchor, and benzene models are listed in descending order. Benzene shows a very small transmission coefficient which indicates that there is no available orbital for current flow between the electrodes.

Figure 29:
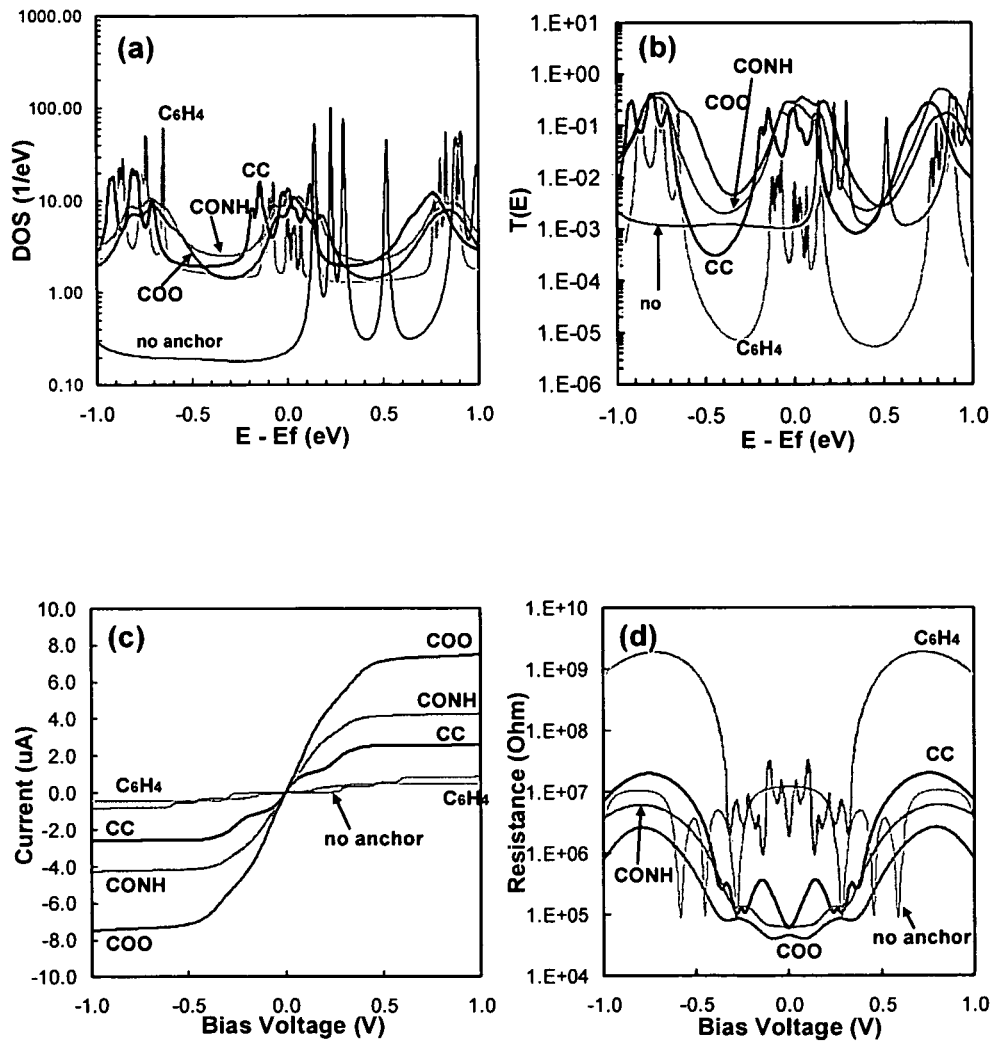

In turn, the I-V characteristics (FIG. 29(c)), the conductance (FIG. 29(d)) and total resistance per unit area (FIG. 29(e)) correlate directly with the transmission coefficient. Applicants calculated contact resistances of 43 kΩ for carboxyl anchor, 58 kΩ for amide anchor, 128 kΩ for acetylene anchor, 10.3 MΩ for benzene anchor, and 11.7 MΩ for Cu without anchor after averaging for a bias voltage from −0.1 V to 0.1 V (see table of FIG. 30), where the bias voltage is defined as the difference between the source and the drain voltage. These values should be interpreted as a relative evaluation of these models.

Example 6

Mechanical Stability and Electrical Enhancement of Various Anchors

The interaction energies of various anchors (table of FIG. 27) indicate that all anchors are good candidates for enhancing the mechanical stabilities of the Cu-nanotube interface as compared to that of the Cu without anchor which has an interaction energy of 4.8 kcal/mol with a separation of 3.30 Å. The acetylene anchor obtains the largest mechanical stability of all others because of the strong cohesive energy, that is also represented by the short separations to Cu(111) surface and graphene. The snap bond energy of benzene anchor is smaller than the acetylene anchor by 62.8 kcal/mol and the separation between anchor-Cu(111) and anchor-graphene are larger by 1.48 times and 1.07 times respectively, which is possibly due to the steric interactions between the benzene and the surfaces. The snap bond energies of amide and carboxyl anchors are relatively smaller than that of the acetylene anchor since the anchor ions are stabilized by resonance effects. Applicants also found that the second anchor bonds to the resonance position on the SGS to gain stability, which is also true for CNT surface.

By applying the carboxyl anchor, the contact resistance can be reduced by approximately by a factor of 270 when compared to the Cu electrodes without anchors. The contact resistance of the Pd-graphene (no anchor) can be calculated as 159 kΩ. Thus, the carboxyl, amid and acetylene anchors can improve the contact resistance better then the Pd electrodes.

Interestingly, the contact resistance for the benzene anchor is essentially the same as without the anchor. This is because the benzene leads to a total tunneling distance of 7.03 Å which is approximately 50% larger than the other three cases. The experimentally reported anchors applied in self-aligning assemblies, such as sodiumdodecylsulphate (SDS) [see reference 52] and long-chained aryldiazonium salts [see reference 53] which possess long alkyl chains ($C_{12}$ and $C_{11}$ respectively) leading the large separations, are likely to dramatically increase the contact resistance.

Example 7

Assembly of a CNT-Anchor-Cu Electrode Systems

FIG. 31 shows an outline of processing steps that might be used to implement the assembly of CNT-anchor-Cu electrode systems of the present disclosure. There have been studies which reported ways to implement the CNTs at a specific place on the wafer by functionalizing the CNTs [see references 54-55] or by functionalizing the surface of the substrate [see reference 73] or both [see reference 56]. Some of the functional molecules from the CNT surface can be successfully removed and pristine CNTs are restored (see FIG. 31(a)). [see references 55-56] After this process, the CNTs can be masked for the implementation of the electrodes to avoid unfavorable deformations of the CNTs (see FIG. 31(b)), followed by treatment with anchor precursors (see FIG. 28 FIG. 31(c)). This step should be realized easily since there have already been experimental reports of the functionalized CNTs with the anchors as we stated previously. [see references 61-64] Finally, the Cu electrodes can be deposited on top of them and the masks can be removed (see FIG. 31(d)).

In accordance with the embodiments above, using quantum mechanical methods shows that appropriate anchors can dramatically reduce the contact resistance of Cu-CNT and Cu-SGS interfaces, while increasing mechanical stability. Of the four anchors Applicants considered, the best Cu interface is carboxyl (275 times lower than perfect Cu-SGS interface), followed by amide, acetylene and benzene in descending order. Introducing the carboxyl anchor at the Cu-SGS interface can improve the contact resistance by 3.7 times compared to the Pd-SGS interface without an anchor, making the Cu electrodes a good candidate for the CNT or SGS electronics.

FIG. 31, discussed above, illustrates the processing steps that might be used to implement the assembly of CNT-anchor-Cu electrode systems. In the section, most of the steps for constructing self assembling CNT-anchor-Cu electrode systems were demonstrated.

The anchors should be selected to reduce contact resistance as demonstrated in the present writing in the detailed calculations for the above discussed four functional groups. They provide useful guidelines for selecting molecular anchors for carbon black and other graphite materials in addition to CNT and SGS.

Example 8

Functionalization of SWNT by Using Solvent-Free Technique

SWNTs (10 mg) and 4-substituted aniline (4 equiv/mol of carbon) were added to a flask with reflux condenser. Under the protection of N2 atmosphere, isoamyl nitrite (5 equiv/mol of carbon) was added via syringe with caution. Then, the flask was heated to 60 degrees with vigorous stirring for 1.5 h of reaction time. After the flask was cooled down to room temperature, the commencing paste was diluted with DMF, filtered through a Nylon (0.2 um) membrane and washed with copious DMF. The collected filtered paper was then dispersed in DMF by sonication. The resulting solution was filtered and washed again with DMF and ether (to remove DMF). Then the filtration cakes were dried in a vacuum oven overnight and characterized.

In the experiment, outlined above 4-Aminobenzamide and 4-Aminobenzoic acid were chosen as the functionalization groups.

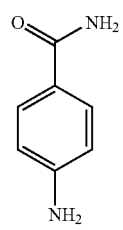

(4-Aminobenzamide)

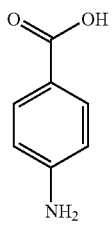

(4-Aminobenzoic acid)

Figure 33:
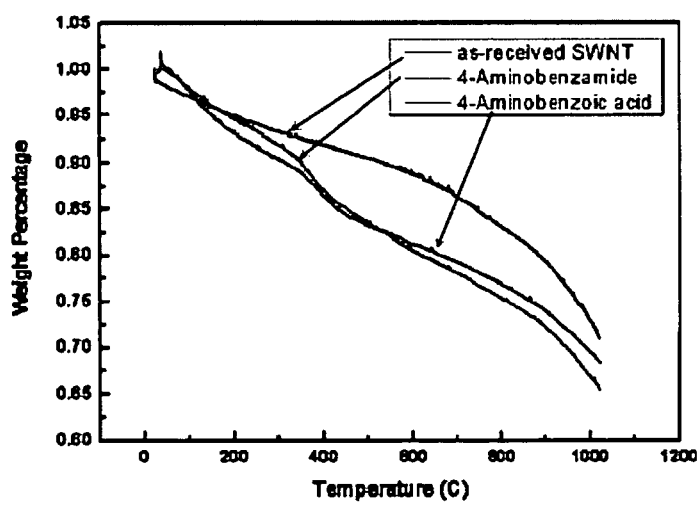
FIG. 33 shows a diagram illustrating functionalization of a graphene-like carbon according to an embodiment herein described.

TGA results showed that functionalization were successful, the loading of the functional groups were estimated around 10%, as illustrated in FIG. 33.

Figure 34:
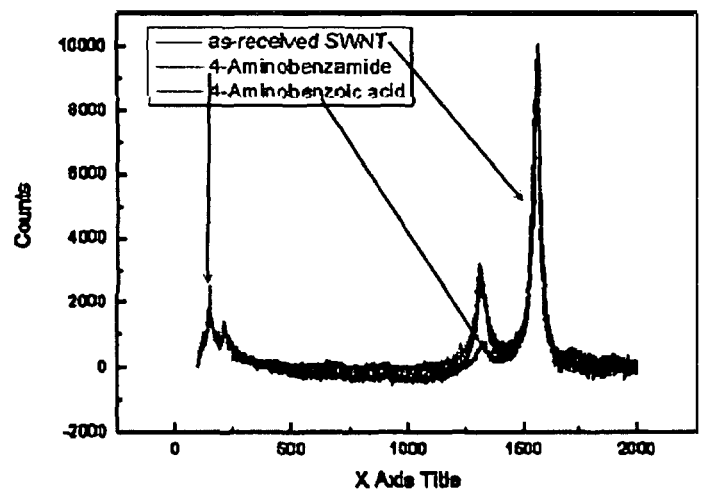
FIG. 34 shows a diagram illustrating functionalization of a graphene-like carbon according to an embodiment herein described.

Raman results showed that after functionalization, the disorder (1290 cm$^{-1}$) modes were greatly enhanced, which indicated that the SWNT were successfully covalent functionalized, as illustrated in FIG. 34.

Then, 10% wt. Pt were deposited on as-prepared SWNT by EG method and characterized by electrochemical methods.

Figure 35:
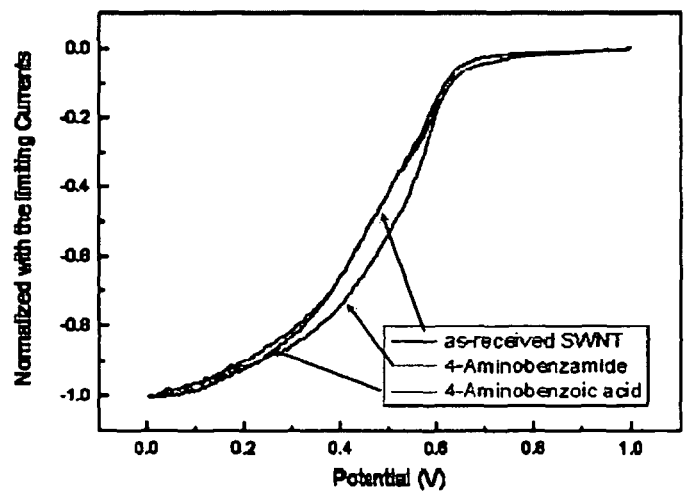
FIG. 35 shows a diagram illustrating functionalization of a graphene-like carbon according to an embodiment herein described.
Figure 36:
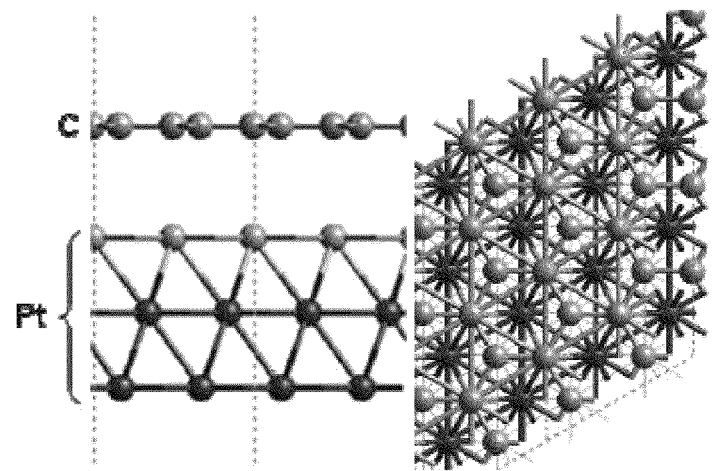
FIG. 36 shows an optimized structure of graphene on Pt 111 surface.
Figure 37:
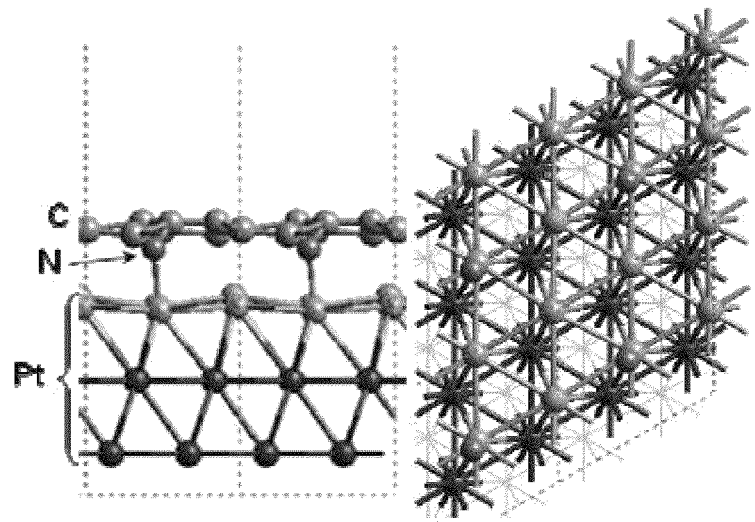
FIG. 37 shows optimized structures of graphene linked with Pt 111 surface by —N— anchor.
Figure 38:
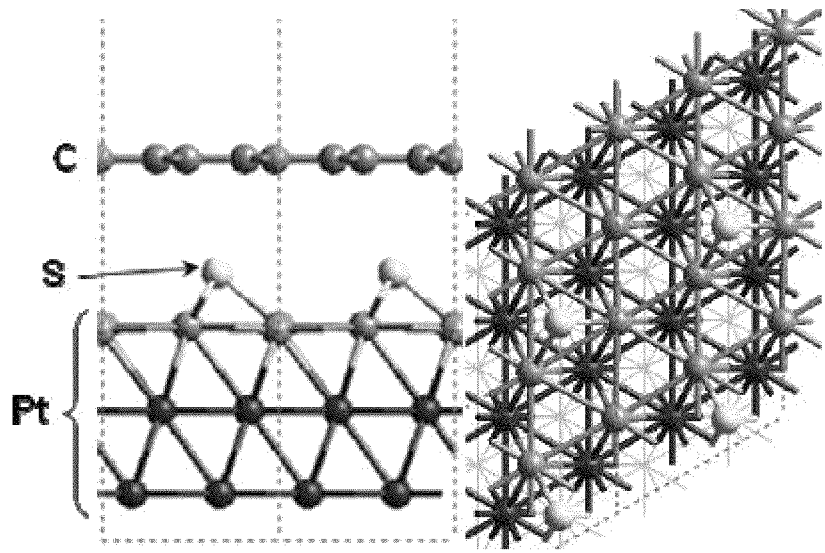
FIG. 38, shows an optimized structure of graphene linked with Pt 111 surface by —S— anchor.
Figure 39:
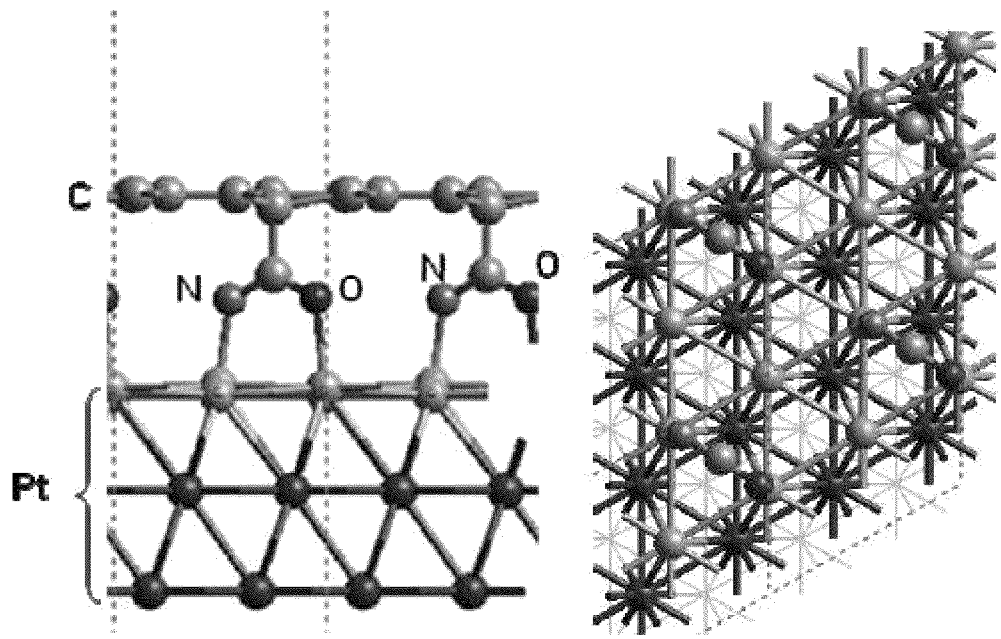
FIG. 39 shows an optimized structure of graphene linked with Pt 111 surface by —CON— anchor.
Figure 40:
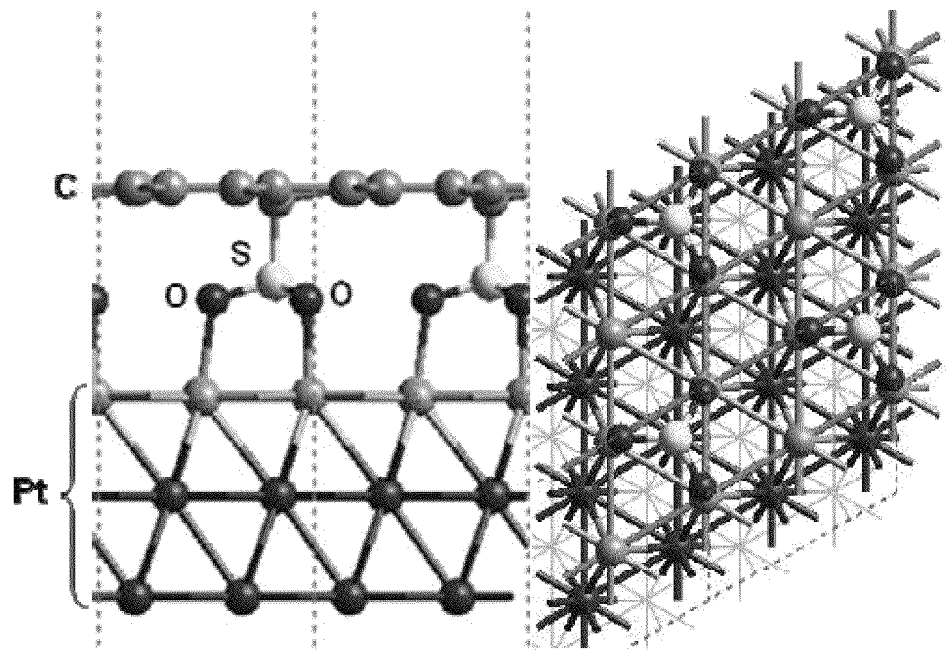
FIG. 40 shows an optimized structure of graphene linked with Pt 111 surface by —SO3- anchor.
Figure 41:
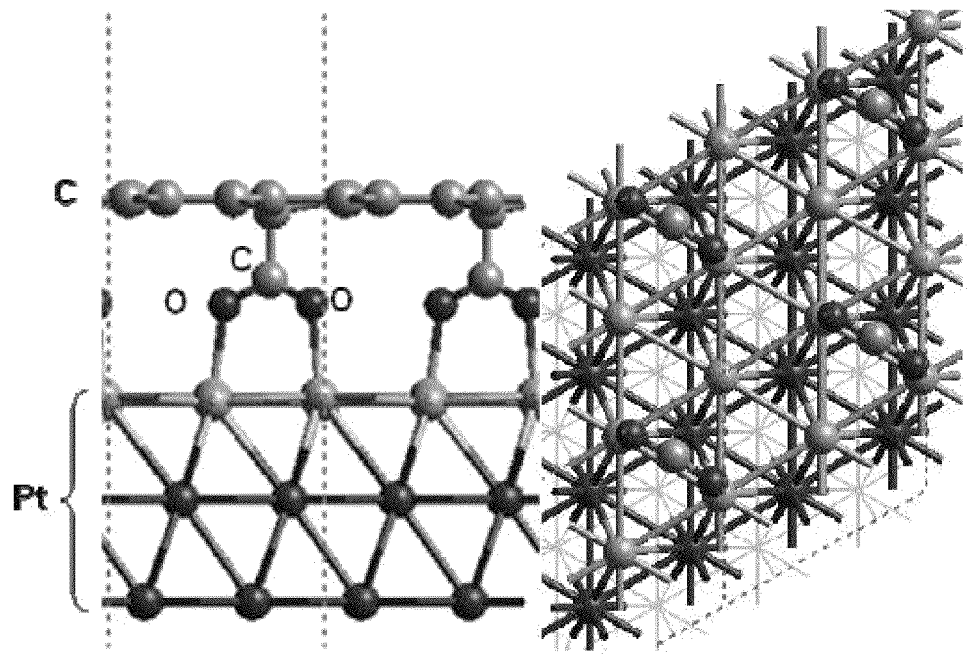
FIG. 41 shows an optimized structure of graphene linked with Pt 111 surface by —COO— anchor.
Figure 42:
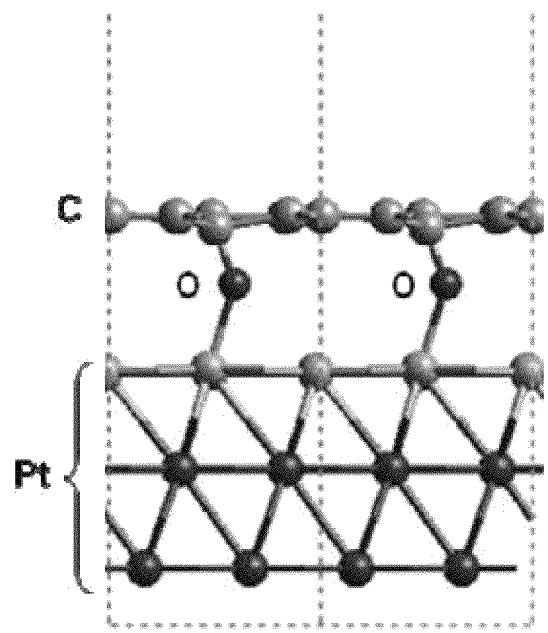
FIG. 42 shows an optimized structure of graphene linked with Pt 111 surface by —O— anchor.
Figure 43:
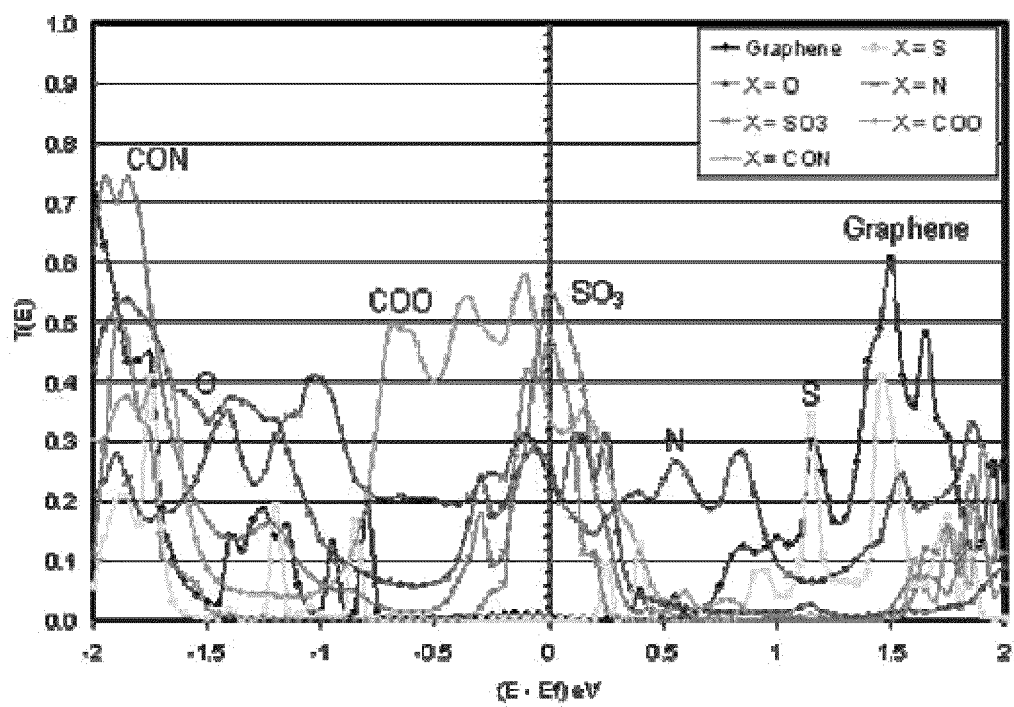
FIG. 43 shows transmission functions of the sandwich structures.
Figure 44:
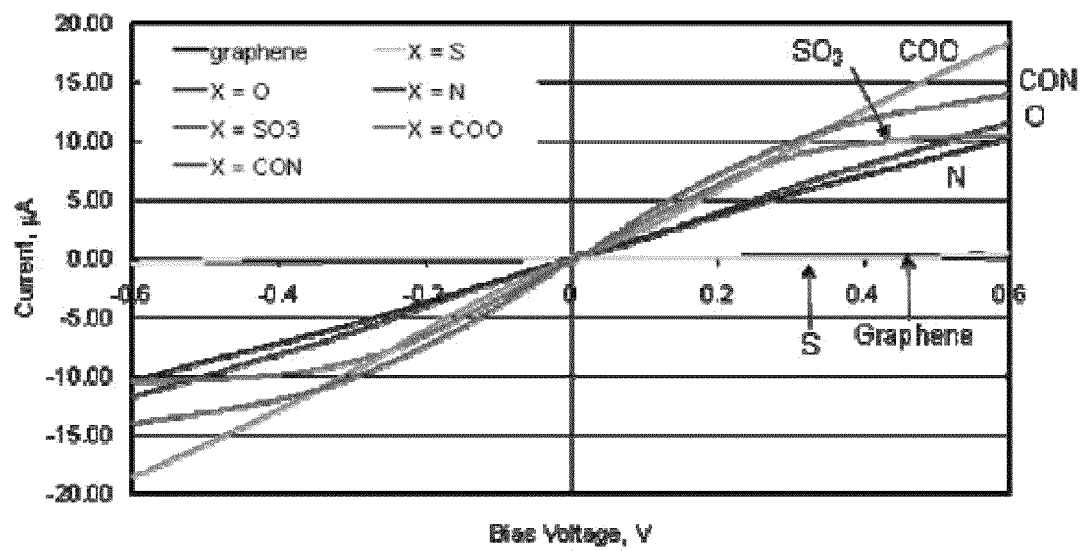
FIG. 44 shows IV curves of the sandwich device structures.
Figure 45:
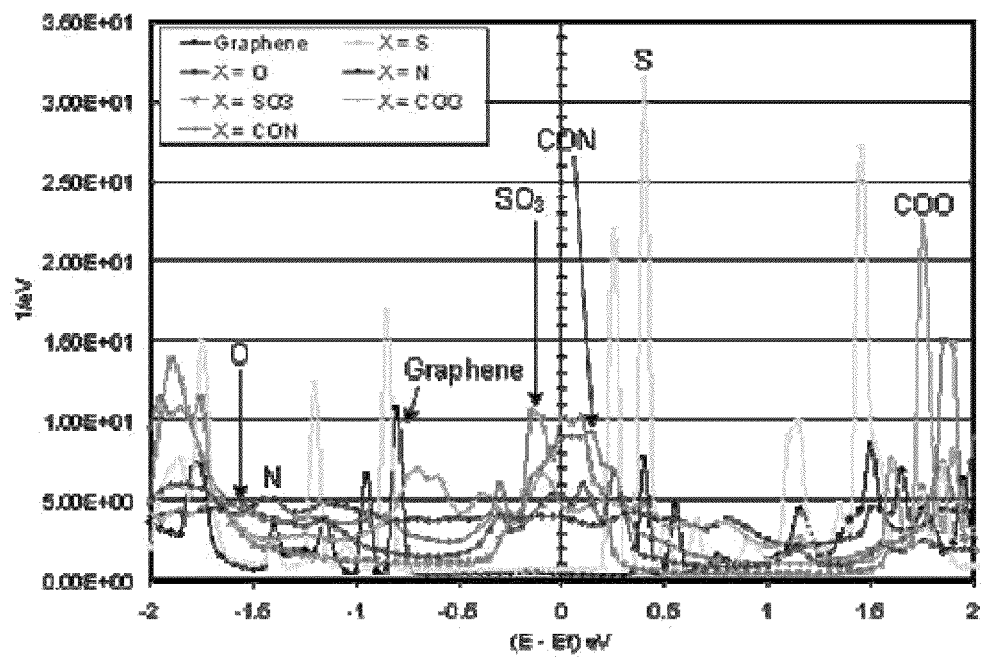
FIG. 45 shows density of state of the sandwich structured device.
Figure 46:
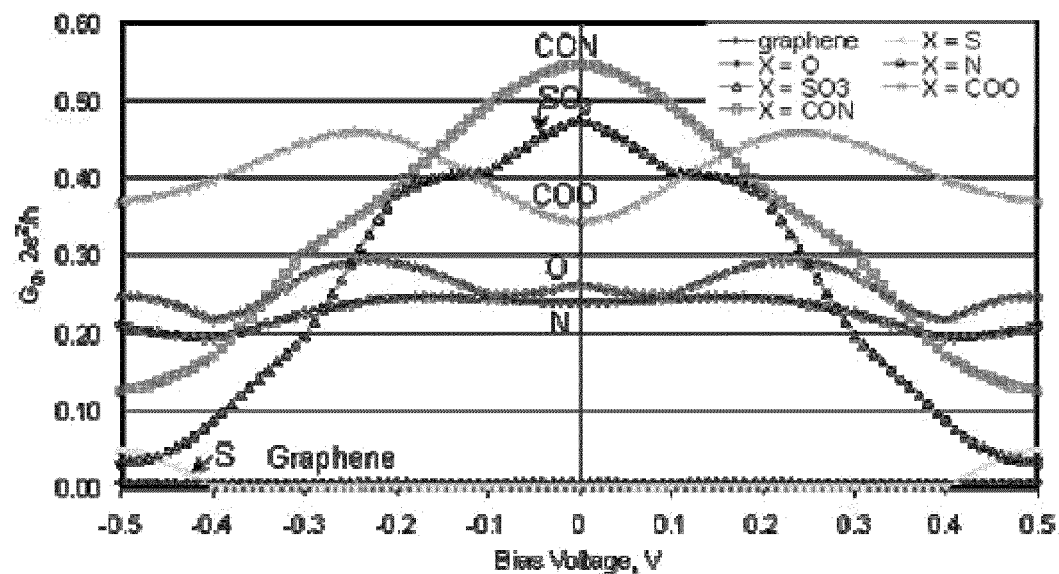
FIG. 46 shows electric conductivities of the sandwich structured device.

0M HClO4, 50 mV/s, N2 purged, as illustrated in FIG. 35.

ORR test: 1.0M HClO4, 50 mV/s, O2 purged. Normalized with the limiting current

The catalyst whose support was functionalized by 4-Aminobenzamide showed the best ORR activity.

Example 9

Validation of Accuracy for in Silico Evaluation of Interfacial Contact Resistance Measurements of contact resistance for nanoscale contacts are difficult. Problems include: assessing the actual magnitude of the contact area between the nanotube and the metal, the quality of the connection of macroscopic leads to the nanoscale contacts, additional contact resistance due to these contacts, stray electrical pathways in the nanoscale system that might carry part of the current, and contaminants at the interface between the metal electrode and the CNT. For these reason there have been very few attempts reported to measure the specific contact resistance (Ω/atom) at the metal-nanotube or metal-graphene interfaces.

The only reliable experimental data for the magnitude of the specific contact resistance for metal-graphene or metal-nanotube interfaces of which Applicants are aware is the recent report by Kanbara et al. [reference 74] for the case of the Pt-CNT side-contacted interface. Reference 74 reported four-terminal experiments for a Pt electrode that was 5 nm thick and approximately 500 nm wide along the CNT, deposited on the side of the CNT and protected with 60 nm of Au. This "side-contacted" metallic SWNT was reported to have a diameter in the range of 1.0-1.5 nm. They found a contact resistance of $R_{side-cont} \approx 5$ kΩ for a system with a length between contacts of approximately 1 µm (500 nm×2 contacts). [reference 74] To analyze these experimental results to obtain the specific contact resistance, Applicants assume that the single-walled carbon nanotube (SWNT) was the (10,10) type most commonly produced for such experiments. This has a diameter of 1.37 nm. Given the length of the contact along the SWNT of 1 µm (1,000 nm) and assuming that 50% of the carbon atoms around the circumference of the SWNT are in contact with electrodes, Applicants estimate that the contact has $N_{side-cont}$=40/2.47 (periodic unit length, m)×1, 000 (nm)×0.5 (50%)=8,097 carbon atoms in contact with the Pt. Thus Applicants estimate that the experimental specific contact resistance per carbon atom, is $Rc_{side-cont}=R_{side-cont} \times N_{side-cont}$=5,000×8,096=40.5 MΩ.

This experimental value of 40.5 MΩ can be compared with Applicants' previously reported calculations [reference 75] for Pt side contacted to graphene, which led to a specific contact resistance of $Rc_{side-cont}$=35.7 MΩ per carbon atom. Given all uncertainties in the experiment, this is excellent agreement. This validates that the QM theory can be used to predict accurate contact resistances, enabling in silico design of improve systems such as the functional anchors described here.

In particular, the examples set forth above are provided to give those of ordinary skill in the art a complete disclosure and description of how to make and use the embodiments of the structures, devices, systems and methods of the disclosure, and are not intended to limit the scope of what the inventors regard as their disclosure. Modifications of the above described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually. Appendix A herein enclosed and any of the reference further cited therein is also incorporated by reference in its entirety, to the same extent as if appendix A and each reference cited therein had been incorporated by reference in its entirety individually.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing of the specific examples of appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

ANNEX A

Functional Anchors of Pt Nanoparticles to Multi-Walled Carbon Nanotubes for Nanostructured Fuel Cell Electrocatalysts The present Annex includes sections S1, S2 and S3.
Section S1 describes the computation and theoretical methodologies;
Section S2 describes the experimental procedures; and
Section S3 describes detailed computation results.
Section S1. Theoretical Methodology S1.1 DFT Calculation:

Applicants used CASTEP to calculate the binding energy between graphene and Pt surface connected by various anchors. A periodic slab that includes three layers of platinum totalizing 12 atoms was used to describe Pt (111) surface. The unit cell c parameter was set to be 18 Å at z direction for keeping 50% of the unit cell as vacuum in order to avoid any interaction between slabs. The calculations were performed by using nonlocal density functional theory (DFT) with the generalized gradient approximation (GGA-II) and periodic boundary conditions. [Perdew, J. P. and Y. Wang, Phys. Rev. B 1992, 46, 6671.] We used the ultrasoft plane wave pseudopotentials generated with the optimization scheme of Lin et al. [Lin, J. S.; Qteish, A.; Payne, M. C.; and Heine, V. Phys. Rev. B 1993, 47, 4174] Applicants found a cutoff of 380 eV and a k-point sampling of 2×2×1 were sufficient for convergence. All energies were extrapolated to 0 K using the correction technique of Gillan and De Vita [De Vita, A.; and Gillan, M. J. J. Phys.: Condens. Matter 1991. 3, 6225]. All calculations were performed with the CASTEP code in the CERIUS2 software package. [CASTEP module: Accelrys_Inc Cerius2 Modeling Environment, Release 4.0; Accelrys Inc.: San Diego, 1999.]

S1.2 I-V Calculation

Generally the current through molecules is expressed as:

$$I(V) = \frac{2e}{h} \int_{-\infty}^{\infty} T(E, V)[f_1(E, V_1) - f_2(E, V_2)] dE \quad (1)$$

where $f_i$ is the Fermi-Dirac function for a voltage Vi at electrode i(1 or 2). The transmission function, $T(E,V)$, is the sum of transmission probabilities of all channels available at energy E and is obtained through the Green function of the molecule, $G_M$, as affected by the electrode contacts.

$$T(E,V) = \text{Trace}[\Gamma_1(V) G_M(E,V) \Gamma_2(V) G_M^+(E,V)] \quad (2)$$

$\Gamma_i$ describes the coupling at electrode i.

The Green function of the molecule in equation (2), $G_M$, is calculated from the molecular Hamiltonian, $H_{MM}(V)$, i.e., $$G(E) = \begin{bmatrix} g_1^{-1} & -\tau_1 & 0 \\ -\tau_1^+ & ES_{MM} - H_{MM} & -\tau_2^+ \\ 0 & -\tau_2 & g_2^{-1} \end{bmatrix} = \begin{bmatrix} G_1 & G_{1M} & G_{12} \\ G_{M1} & G_{MM} & G_{2M} \\ G_{21} & G_{M2} & G_2 \end{bmatrix} \quad (3)$$

The submatrices G and g represent Green functions when interactions among subsystems are included or excluded, respectively. $g_i$ represents the electrodes and $\tau_i$ describe the metal-molecule coupling. $H_{MM}$ and $S_{MM}$ are the Fock and Overlap matrices of the isolated molecule, respectively and E is the electron energy. Therefore, solving eq 3 for $G_M$, we obtain $$G_M = [ES_{MM} - H_{MM} - \Sigma_1 - \Sigma_2]^{-1} \quad (4)$$

where $$\Sigma_1 = \tau_1^+ g_1 \tau_1 \text{ and } \Sigma_2 = \tau_2^+ g_2 \tau_2 \quad (5)$$

where $\Sigma_i$ are the self-energy terms coupling between the molecule and the electrodes.

All the needed parameters can be obtained from the Fock and Overlap matrices based on DFT calculations.

$$F = \begin{bmatrix} H_{11} & H_{1M} & H_{12} \\ H_{M1} & H_{MM} & H_{M2} \\ H_{21} & M_{2M} & H_{22} \end{bmatrix} \text{ and } S = \begin{bmatrix} S_{11} & S_{1M} & S_{12} \\ S_{M1} & S_{MM} & S_{M2} \\ S_{21} & S_{2M} & S_{22} \end{bmatrix} \quad (6)$$

The metal-molecule coupling term $\tau_i$ can be determined by $$\tau_1 = ES_{M1} - H_{M1} \text{ and } \tau_2 = ES_{M2} - H_{M2} \quad (7)$$

$H_{Mi}$ are the coupling matrix element between electrode and molecules.

The coupling $\Gamma_i$ appearing in eq. 2 is given by $$\Gamma_1 = i[\Sigma_1 - \Sigma_1^+] \text{ and } \Gamma_2 = i[\Sigma_2 - \Sigma_2^+] \quad (8)$$

$g_i$ are the surface green function of the electrode. For Au we approximate this as a diagonal matrix with each element proportional to their local density of states.

$$g_i = \begin{bmatrix} g_s & 0 & 0 & \cdots \\ 0 & g_p & 0 & \cdots \\ 0 & 0 & g_d & \cdots \\ \cdots & \cdots & \cdots & \cdots \end{bmatrix} \quad (9)$$

Section S2. Experimental Setup and Materials

S2.1 Materials

The surface modified multi-walled carbon nanotubes (MWCNTs) were ordered at nanocyl.com The amount of function groups have been identified by XPS summarized in Table S1.

Pt precursors is $H_4PtCl_6$.

Surface modified MWCNTs have different anchor groups on the surface. Table S2 lists anchor energy between the anchor and CNTs.

TABLE S1

The surface groups ratio determined by XPS (provided by nanocycl.com)

| Samples | Anchor amount | Anchor groups | Distribution |
|---|---|---|---|
| Purified | 3.5 wt % | COOH | N.A. |
|  |  | OH, OR | N.A. |
| —SH | 0.6 wt % | SH | 90% |
|  |  | SO3H | 10% |
| —COOH | 4.5 wt % | COOH | N.A. |
|  |  | OH, OR | N.A. |
| —NH2 | 1.0 wt % | NH2, NR | 50% |
|  |  | CONH2 | 50% |

S2.2 Preparation of Pt/MWCNTs

Pt-based catalysts were prepared by the EG method. 140 mg of different MWCNTs was suspended in 20 mL of ethylene glycol solution and stirred with ultrasonic treatment for 20 min. 30 ml of hexachloroplatinic acid EG solution (2.0 mg Pt/mL EG) was added to the solution drop wise also under mechanically stirred conditions for 4 h. NaOH (2.5 M in EG solution) was added to adjust the pH of the solution to above 13, and then the solution was heated at 140° C. for 3 h to ensure that Pt was completely reduced; the entire EG solution has a DI water content of 5 vol %. Refluxing conditions were used to keep water in the synthesis system. The whole preparation process was also conducted under flowing argon. The solid was filtered and washed with 1.5 L of DDI water and then dried at 70° C. for 8 h. The Pt/MWCNT catalysts with a metal loading of 30 wt % were obtained.

S2.3 Electrochemical Measurement
S2.3.1. Preparation of Rotating Disk Electrodes The active layers of the as-prepared catalysts (Pt/MWCNT-SH, Pt/MWCNT-purified, Pt/MWCNT-COOH and Pt/MWCNT-NH$_2$) on the RDE were prepared using a method briefly explained here. A mixture containing 8 mg of Pt/MWCNT powder and 2 ml of ethanol was ultrasonically blended in a glass vial for 2-3 hours. A volume of 10 μl of this ink was spread on the surface of a vitreous carbon RDE (0.196 cm$^2$) using a microsyringe and dried in an air oven at 80° C. for about 10 min to obtain a thin active layer. After drying, to bind catalyst powders on RDE surface, about 10 μl of 0.1% Nafion solution was added by using the syringe to make sure that surface is flat. At last, DI water was added on the catalyst surface to check if air bubble occurs. We must make sure that no bubble will form on the surface. To confirm the reproducibility of the results, three electrodes were prepared and tested for each catalyst.

S2.3.2. Measurements in Liquid Electrolytes

RDEs were used to record cyclic voltammograms in oxygen or argon saturated liquid electrolytes. Argon saturated electrolytes were used to obtain the electrochemical active area of the Pt particles. The liquid electrolyte was H$_2$SO$_4$ (0.5 M). A Ag/AgCl was used as reference electrodes. The cyclic voltammograms obtained on the stationary RDEs in Ar saturated solutions at the san rate of 50 mV/s. The polarization curves for oxygen reduction kinetics on the as-prepared catalysts obtained on the rotating (3000 rpm) RDE in oxygen saturated solutions at the scan rate of 5 mV/s.

Section S3. Detailed Calculation Results
S3.1 Anchor Energies

Table S2 lists the absolute value calculated from CASTEP GGA/Ultra-soft procedure from Cerius2.

TABLE S2

Detailed calculation the energy of optimized slab structure (unit: eV).

|  | no-anchor | S linker | O linker | N linker | SO3 | COO linker | CON linker |
| --- | --- | --- | --- | --- | --- | --- | --- |
| Pt surface | −8664.333 | −8664.2002 | −8664.303 | −8664.002 | −8664.361 | −8664.361 | −8664.263 |
| graphehe + anchor | −1240.847 | −1516.5370 | −1677.158 | −1511.547 | −2832.737 | −2270.971 | −2102.563 |
| Pt + anchor + graphene | −9905.279 | −10187.0057 | −10342.153 | −10178.234 | −11498.884 | −10937.516 | −10770.608 |
| Anchor energy (Pt-Anchor) | −0.099 | −6.2684 | −0.692 | −2.685 | −1.785 | −2.184 | −3.782 |
| Pt + anchor |  | −8946.1463 | −9100.227 | −8933.128 | −10258.551 | −9695.874 | −9528.904 |
| Graphene |  | −1240.8591 | −1239.707 | −1238.604 | −1239.963 | −1239.802 | −1239.816 |
| Anchor energy (C-anchor) |  | −0.0002 | −2.219 | −6.502 | −0.370 | −1.841 | −1.887 |

S3.2 Anchor Structures
See FIGS. 36-42.

S3.3 Calculated Electron Transport Properties
See FIGS. 43-46

LIST OF REFERENCES

1. Iijima, S.; *Nature* 1991, 354, 56
2. Bethune, D. S.; Kiang, C. H., Devries, M. S.; Gorman, G.; Savoy, R.; Vazquez, J.; Beyers, R.; *Nature* 1993, 363, 605-607.
3. Kiang, C. H.; Goddard, W. A.; Beyers, R., Salem, J. R.; Bethune, D. S.; *J. Phys. Chem.* 1994, 98, 6612-6618.
4. Chen, R. J.; Bangsaruntip. S.; Drouvalakis, K. A.; Kam, N. W. S.; Shim, M.; Li, Y. M.; Kim, W.; Utz, P. J.; Dai, H. J.; *Proc. Nat. Acad. Sci. USA.* 2003, 100, 4984-4989.
5. Zhang, Y. G.; Chang, A. L.; Cao, J.; Wang, Q.; Kim, W.; Li, Y. M.; Morris, N.; Yenilmez, E.; Kong, J.; Dai, H. J.; *Appl. Phys. Lett.* 2001, 79, 3155-3157.
6. Ziegler, M. M., Picconatto, C. A.; Ellenbogen, J. C.; Dehon, A.; Wang, D.; Zhong, Z.; Lieber, C. M.; *Ann. N.Y. Acad. Sci.* 2003, 1006, 312-330.
7. Baughman, R. H.; Zakhidov, A. A.; de Heer W. A.; *Science* 2002, 297, 787-792.
8. Zutic, I., Fuhrer, M.; *Nature Phys.* 2005, 1, 85-86.
9. Keren, K.; Berman, R. S.; Buchstab, E.; Sivan, U.; Braun, E.; *Science* 2003, 302, 1380-1382.
10. Huang, Y.; Duan, X. F.; Cui, Y.; Lauhon, L. J.; Kim, K. H. and Lieber C. M.; *Science,* 2001, 294, 1313-1317.
11. Shirai, Y.; Osgood, A. J.; Zhao, Y. M.; Kelly, K. F.; Tour, J. M.; *Nano Lett.* 2005, 5, 2330-2334.
12. Luo, Y.; Collier, C. P.; Jeppesen, J. O.; Nielson, K. A.; Delonno, E.; Ho, G.; Perkins, J.; Tseng, H.; Yamamoto, T.; Stoddart, J. F.; and Heath, J. R.; *Chem Phys Chem* 2002, 3, 519-525.
13. Guo, S.; Fogarty, D. P.; Nagel, P. M.; Kandel, S. A.; *J. Phys. Chem. B* 2004, 108, 14074-14081.
14. Lee, J. O.; Park, C.; Kim, J. J.; Kim, J.; Park, J. W.; Yoo, K. H. *J. Phys. D—Appl. Phys.* 2000, 33, 1953-1956.
15. Kazuaki Yasuda, K.; Taniguchi, A.; Akita, T.; Ioroi, T.; and Siroma, Z.; *Phys. Chem. Chem. Phys.* 2006, 8, 746-752
16. Xue, Y. Q.; Datta, S.; Ratner, M. A.; *J. Chem. Phys.* 2001, 115, 4292-4299.
17. Seminario, J. M.; Zacarias, A. G.; Derosa, P. A. *J. Phys. Chem. A* 2001, 105, 791.
18. Ke, S. H.; Baranger, H. U.; Yang, W. T. *Phys. Rev. B* 2004, 70, Art. No. 085410 AUG 2004
19. Deng, W. Q.; Muller, R. P.; Goddard, W. A.; *J. Am. Chem. Soc.* 2004, 126, 13562-13563.
20. Kim, Y. H.; Jang, S. S.; Jang, Y. H.; Goddard, W. A. *Phys. Rev. Lett.* 2005, 94, No. 156801.
21. Schultz, P. SeqQuest Project (Sandia National Laboratories, Albuquerque, N. Mex., 2003).
22. Guo X F, Small J P, Klare J E, et al. *Science,* 2006, 311, 356-359.
23. Blurton, K. F.; Kunz, H. R.; and Rutt, D. R.; *Electrochim. Acta,* 1978, 23, 183-190.
24. "*Handbook of fuel cells: fundamentals, technology, and applications*" edited by W. Vielstich, A. Lamm, H. A. Gasteiger.
25. C. Wang, M. Waje, X. Wang, J. M. Tang, R. C. Haddon, Y. S. Yan, *Nano Lett.* 2004, 4, 345-348.
26. X. Wang, M. Waje, and Y. S. Yan, *Electrochemical & Solid State Letter* 2004, 8:A42-A44.
27. M. Endo, T. Hayashi, Y. A. Kim, M. Terrones, M. S. Dresselhaus, *Philosophical of the Royal Society of London*

Series A—Mathematical Physical and Engineering Sciences 2004, 362, 2223-2238.
28. G. Girishkumar, K. Vinodgopal, P. V. Kamat, *J. Phys. Chem. B* 2004, 108, 19960-19966.
29. H. A. Gasteiger, S. S. Kocha, B. Sompalli, F. T. Wagner *Appl. Cataly. B, Environ.,* 2005, 56, 9-35.
30. L. Marty, V. Bouchiat, C. Naud, M. Chaumont, T. Fournier, and A. M. Bonnot, *Nano Lett.* 2003, 3, 1115-1118.
31. J. Xie, D. L. Wood, D. M. Wayne, T. A. Zawodzinski, P. Atanassov, R. L. Borup, *Journal of the Electrochemical Society* 2005, 152, A104-a113.
32. S. Niyogi, M. A. Hamon, H. Hu, B. Zhao, P. Bhowmik, R. Sen, M. E. Itkis, R. C. Haddon, *Accounts Chem. Res.* 2002, 35, 1105-1113.
33. D. K. James, and J. M. Tour, *Chem. Mater.* 2004, 16, 4423-4435.
34. R. L. McCreery, *Chem. Mater.* 2004, 16, 4477-4496.
35. W. Z. Li, C. H. Liang, W. J. Zhou, J. S. Qiu, Z. H. Zhou, G. Q. Sun, and Q. Xin, *Journal of Physical Chemistry B* 2003, 107, 6292-6299.
36. For these calculations Applicants employed the CASTEP periodic QM software (from Accelrys) using the Perdew generalized gradient approximation II density functional combined with ultrasoft pseudopotential plane-wave basis set. The kinetic energy cut off for plane waves is 380 eV enough for convergences.
37. Y. Q. Xue, S. Datta, and M. A. Ratner, *J. Chem. Phys.* 2001, 115, 4292-4299.
38. W.-Q. Deng, R. P. Muller, W. A. Goddard, *J. Am. Chem. Soc.* 2004, 126, 13562-13563.
39. P. Schultz, SeqQuest Project (Sandia National Laboratories, Albuquerque, N. Mex., 2003). http://www.cs.sandia.gov/~paschul/Quest/40.
Y. H. Kim, S. S. Jang, Y. H. Jang, W. A. Goddard, Phys. Rev. Lett., 2005, 94, 156801.
41. Javey, A.; Guo, J.; Wang, Q.; Lundstrom, M.; Dai, H. *Nature* 2003, 424, 654.
42. Mann, D.; Javey, A.; Kong, J.; Wang, Q.; Dai, H. *Nano Lett.* 2003, 3, 1541.
43. Frank, S.; Poncharal, P.; Wang, Z. L.; de Heer, W. A. *Science* 1998, 280, 1744.
44. Oostinga, J. B.; Heersche, H. B.; Liu, X.; Morpurgo, A. F.; Vandersypen, L. M. K. *Nature Materials* 2008, 7, 151.
45. Geim, A. K.; Novoselov. K. S. *Nature Materials* 2007, 6, 183.
46. Ryan, J. G.; Geffen, R. M.; Poulin, N. R.; Paraszczak, J. R. *IBM J Res. Develop.* 1995, 39, 371.
47. Licata, T. J.; Colgan, E. G.; Harper, J. M. E.; Luce, S. E. *IBM J. Res. Develop.* 1995, 39, 419.
48. McNally, P. J.; Kanatharana, J.; Toh, B. H. W.; McNeill, D. W.; Danilewsky, A. N.; Tuomi, T.; Knuuttila, L.; Riikonen, J.; Toivonen, J.; Simon, R. *J. Appl. Phys.* 2004, 96, 7596.
49. Talanov, V. V.; Scherz, A.; Schwartz, A. R. *Appl. Phys. Lett.* 2006, 88, 262901.
50. Matsuda, Y.; Wei-Qiao, D.; Goddard, W. A., III. *J. Phys. Chem. C.* 2007, 111, 11113.
51. Wang, Y.; Iqbal, Z.; Mitra, S. *J. Am. Chem. Soc.* 2006, 128, 95.
52. Narain, R.; Housni, A.; Lane, L. *J. Poly. Sci. A.* 2006, 44, 6558.
53. Mickelson, E. T.; Chiang, I. W.; Zimmerman, J. L.; Boul, P. J.; Lozano, J.; Liu, J.; Smalley, R. E.; Hauge, R. H.; Margrave, J. L. *J. Phys. Chem. B.* 1999, 102, 4318.
54. Choi, K. H.; Bourgoin, J. P.; Auvray, S.; Esteve, D.; Duesberg, G. S.; Roth, S.; Burghard, M. *Surface Science* 2000, 462, 195.
55. Klinke, C.; Hannon, J. B.; Afzali, A.; Avouris, P. *Nano Lett.* 2006, 6, 906.
56. Li, S.; Yan, Y.; Liu, N.; Chan-Park, M. B.; Zhang, Q. *Small* 2007, 4, 616.
57. Song, C.; Xia, Y.; Zhao, M.; Liu, X.; Li, F.; Huang, B. *Chem. Phys. Lett.* 2005, 415, 183.
58. Zhang, Y.; Suc, C.; Liu, Z.; Li, J. *J. Phys, Chem. B.* 2006, 110, 22462.
59. Zurek, E.; Picard, C. J.; Autschbach, J. *J. Am. Chem. Soc.* 2007, 129, 4430.
60. Wei-Qiao, D.; Matsuda, Y.; Goddard, W. A., III. *J. Am. Chem. Soc.* 2007, 129, 9834.
61. McEuen, P. L.; Fuhrer, M. S.; Park, H. *IEEE Transaction on Nanotechnology.* 2002, 1, 78.
62. Bahr, J. L.; Yang, J.; Kosynkn, D. V.; Bronikowski, M. J.; Smalley, R. E.; Tour, J. M. *J. Am. Chem. Soc.* 2001, 123, 6536.
63. Dyke C. A.; Tour, J. M. *Nano Lett.* 2003, 3, 1215.
64. Liang, F.; Sadama, A. K.; Peera, A.; Chattopadnyay, J.; Gu, Z.; Hauge, R. H.; Billups, W. E. *Nano Lett.* 2004, 4, 1257.
65. Ramanathan, T.; Fisher, F. T.; Ruoff, R. S.; Brinson, L. C. *Chem. Mater.* 2005, 17, 1290.
66. Schultz, P. A. SEQQUEST code; Sandia National Labs: Albuquerque, N. Mex., 2005. http://dft.sandia.gov/Quest/.
67. Mattsson, A. E.; Schultz, P. A.; Desjarlais, M. P.; Mattsson, T. R.; Leung, K. *Modelling Simul. Mater. Sci. Eng.* 2005, 13, R1-R31.
68. Perdew, J. P.; Burke, K.; Ernzerhof, M. *Phys. Rev. Lett.* 1996, 77, 3865.
69. Kim, Y.-H.; Tahir-Kheli, J.; Schultz, P. A.; Goddard, W. A., III. *Phys. Rev. B* 2006, 73, 235419.
70. Song, C.; Xia, Y.; Zhao, M.; Liu, X.; Li, F.; Huang, B. *Chem. Phys. Lett.* 2005, 415, 183.
71. Veloso, M. V.; Filho, A. G. S.; Filho, J. M.; Fagan, S. B.; Mota, R. *Chem. Phys. Lett.* 2006, 430, 71.
72. *CRC Handbook of Chemistry and Physics, 87th ed.*; Lide, D. R., Ed.; CRC Press: Boca Raton, Fla., 2006.
73. Liu, J.; Casavant, M. J.; Cox, M.; Walters, D. A.; Boul, P.; Lu, W.; Rimberg. A. J.; Smith, K. A.; Colbert, D. T.; Smalley, R. E. *Chem. Phys. Lett.* 1999, 303, 125.
74. Kanbara, T.; Takenobu, T; Takahashi, T.; Iwasa, Y.; Tsukagori, K.; Aoyagi, Y.; Kataura, H. *Appl. Phys. Lett.* 2006, 88, 053118.
75. $^2$Matsuda, Y.; Deng, W.-Q.; Goddard, W. A., III. *J. Phys. Chem. C.* 2007, 111, 11113.
76. Banerjee S; Hemray-Benny T; and Wong S. in *Advanced Material* 2005, 17 No. 1 January 6, pages 17-29.

The invention claimed is:

1. A structure comprising:
a graphene-like carbon;
a conducting material; and
a functional linker directly linking the graphene-like carbon and the conducting material, thus forming a graphene-like carbon-functional linker-conducting material structure, wherein the direct linkage between the graphene-like carbon and the conducting material directly anchors the graphene-like carbon to the conducting material, the conducting material comprising an electrode.

2. The structure of claim 1, wherein the graphene like carbon is selected from the group consisting of single-walled carbon nanotubes, double-walled carbon nanotubes, multiple-walled carbon nanotubes, carbon nanotube bundles, carbon nanotube fibers, single layer graphenes, multiple layer graphenes, graphite surfaces, graphene nano ribbons, and fullerenes.

3. The structure of claim 1 wherein the conducting material is selected from the group consisting of a metal, metal alloys, metal carbides, metal hydrides, metal oxides and metal sulfides.

4. The structure of claim 1, wherein the functional linker bonds to the graphene-like carbon through a covalent bond and the functional linker bonds to the conducting material through an electron sharing bond.

5. The structure of claim 4, wherein the electron sharing bond is selected from the group consisting of ionic bond, hydrogen bond and covalent bond.

6. The structure of claim 1, wherein the functional linker is an organic linker.

7. The structure of claim 1, wherein the functional linker is a π conjugated functional linker.

8. The structure of claim 1, wherein the functional linker has common formula $A_l B_m Z_n$ with l=0 or 1, m=0 or 1 and n=0 or 1, wherein at least one of l and n is 1, wherein A is a functional group having the ability to bind to the conducting material, Z is a functional group having ability to bind the graphene-like carbon, and B is a functional group having ability to bind to both A and Z.

9. The structure of claim 8, wherein the functional linker is selected from the group consisting of A, Z, AZ, and ABZ.

10. The structure of claim 8, wherein A is a compound binding the conducting material through an H bond selected from the group consisting of i) QRp, wherein Q is an element independently selected from the group consisting of O, N, C, B, S, P, Si, Al, Se, As, Ge, Ga In, Sn, Sb, Te, Tl, Pb, Bi, and Po, R is any combination of atoms bonded to Q, p is equal to or greater than 0, and ii) any combination of two or more of said QRp linked together through X, with X being a collection of atoms.

11. The structure of claim 10, wherein A is selected from the group consisting of a carboxylic group, nitrogen, carboxamide, thiol, sulfuric acid, phosphate acid benzene acetylene, amide and any of the compounds having the following formulas —S—, —O—, —N—, —SO₃—, —COO—, and —CON—.

12. The structure of claim 8, wherein Z is selected from the groups consisting of phenyl acetyl, oxygen, nitrogen and a carbon containing group binding a p-π orbital in the graphene-like carbon through a p-π orbital in the carbon containing group.

13. The structure of claim 8, wherein B is a compound of formula $(CR_m)_n$ wherein
R is independently selected from hydrogen, a group containing oxygen, a group containing nitrogen, an halogen, a group containing phosphorous and a group containing sulphur,
m is 0, 1 or 2, and
n is integer.

14. The structure of claim 8, wherein B is a conjugated group selected from the group consisting of

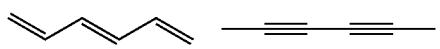

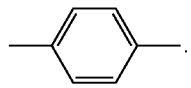

15. The structure of claim 1, wherein the carbon nanotube is selected from the group consisting of: single-walled carbon nanotube, double-walled carbon nanotube and multi-walled carbon nanotube.

16. The structure of claim 1, wherein the conducting material is selected from the group consisting of platinum, copper, palladium, gold, silver, ruthenium, and nickel.

17. An integrated circuit comprising the structure of claim 1.

18. The integrated circuit of claim 17, comprising an interconnect layer, the interconnect layer comprising the graphene-like carbon of claim 1.

19. The integrated circuit of claim 18, wherein the graphene-like carbon is a carbon nanotube and the conducting material is a metal electrode.

20. A method of manufacturing integrated circuits, the method comprising:
providing a conducting material to form at least one electrode;
providing a graphene-like carbon to form at least one portion of an interconnect layer;
providing a functional linker able to directly link the conducting material forming the at least one electrode and the graphene-like carbon; and
contacting the at least one electrode with the directly linked functional linker and the at least one portion of the interconnect layer to form an electrode-functional linker-interconnect layer structure,
the electrode-functional linker-interconnect layer structure being part of the integrated circuit.

21. The method of claim 20, wherein the at least one electrode is part of an electronic device, the electronic device being part of the integrated circuit, the integrated circuit further comprising a semiconductor substrate and a dielectric material, the method comprising:
providing the semiconductor substrate;
forming the electronic device on the semiconductor substrate;
forming a dielectric layer comprising the dielectric material on the semiconductor substrate, and
forming the interconnect layer on the semiconductor substrate;
wherein the functional linker is a functional anchor, and wherein the structure is a graphene-like carbon-functional anchor-electronic device structure.

22. The method of claim 21, wherein the graphene-like carbon is a nanotube manufactured in a separate process prior to being deposited on the semiconductor substrate.

23. The method of claim 21, further comprising a chemical-mechanical polishing of the semiconductor substrate at some point after forming the interconnect layer.

24. A fuel cell comprising the structure of claim 1,
wherein:
a support comprises the graphene-like carbon;
an anode comprises the conducting material;
a cathode comprises the conducting material:
wherein:
the fuel cell further comprises a proton exchange electrolyte membrane, and at least one of the anode and the cathode is linked to the graphene-like carbon by the functional linker capable of linking the conducting material and the graphene-like carbon in a graphene-like carbon-functional linker-conducting material structure.

25. The fuel cell of claim 24, further comprising a catalyst formed of a conducting material wherein the functional linker links the conducting material of the catalyst and the graphene-like carbon of the support in a graphene-like carbon-functional linker-conducting material structure.

26. The fuel cell of claim 24, wherein the functional linker is an organic linker and the conducting material is platinum.

27. The fuel cell of claim 24, further comprising an anode current collector.

28. The fuel cell of claim 24, further comprising manifolds which deliver fuel and oxidant to the anode and cathode respectively.

29. The fuel cell of claim 24, wherein the anode, the proton exchange electrolyte membrane, and the cathode form a membrane electrode assembly with a thickness of no more than about 300 μm.

30. The fuel cell of claim 24 wherein the catalyst is comprised in an amount between 25 wt. % and 35 wt. %.

31. A structure comprising:
a graphene-like carbon;
an electrode; and
a functional linker, linking the graphene-like carbon and the electrode, thus forming a graphene-like carbon-functional linker-electrode structure.

32. The structure of claim 31, wherein the electrode is one or more electrodes, and the functional linker is one or more corresponding functional linkers, linking the graphene-like carbon to a corresponding electrode, whereby the graphene-like carbon-functional linker-electrode structure is a structure with one or more electrodes linked to the graphene-like carbon through respective one or more functional linkers.

33. A structure comprising:
one or more continuously extending individual graphene-like carbons, each continuously extending individual graphene-like carbon comprising two or more functional linkers;
a first electrode; and
a second electrode;
wherein, for each continuously extending individual graphene-like carbon, a first functional linker of the two or more functional linkers directly links the continuously extending individual graphene-like carbon to the first electrode and a second functional linker of the two or more functional linkers directly links the continuously extending individual graphene-like carbon to the second electrode.

* * * * *